US011077655B2

(12) United States Patent
Polit Casillas et al.

(10) Patent No.: US 11,077,655 B2
(45) Date of Patent: Aug. 3, 2021

(54) MULTI-FUNCTIONAL TEXTILE AND RELATED METHODS OF MANUFACTURING

(71) Applicant: California Institute of Technology, Pasadena, CA (US)

(72) Inventors: Raul Polit Casillas, Los Angeles, CA (US); Andrew A. Shapiro, Glendale, CA (US); John Paul Castelo Borgonia, Monrovia, CA (US); Bryan William McEnerney, Redondo Beach, CA (US)

(73) Assignee: California Institute of Technology, Pasadena, CA (US)

( * ) Notice: Subject to any disclaimer, the term of this patent is extended or adjusted under 35 U.S.C. 154(b) by 391 days.

(21) Appl. No.: 15/994,804

(22) Filed: May 31, 2018

(65) Prior Publication Data

US 2018/0345651 A1 Dec. 6, 2018

Related U.S. Application Data

(60) Provisional application No. 62/513,267, filed on May 31, 2017.

(51) Int. Cl.
*B41F 15/08* (2006.01)
*B32B 5/02* (2006.01)
(Continued)

(52) U.S. Cl.
CPC .......... *B41F 15/0831* (2013.01); *B22F 10/20* (2021.01); *B32B 5/024* (2013.01);
(Continued)

(58) Field of Classification Search
CPC ....... B33Y 80/00; B33Y 99/00; Y10T 428/54; Y10T 428/24149; Y10T 428/24727;
(Continued)

(56) References Cited

U.S. PATENT DOCUMENTS 3,833,951 A * 9/1974 Hurwitz .................. B32B 5/26
5/698
RE29,989 E 5/1979 Polk et al.
(Continued)

FOREIGN PATENT DOCUMENTS

CN 103153502 A 6/2013
EP 0127366 A1 5/1984
(Continued)

OTHER PUBLICATIONS

Liu et al., "Metallic Glass Coating on Metals Plate by Adjusted Explosive Welding Technique", Applied Surface Science, Jul. 16, 2009, vol. 255, pp. 9343-9347, doi:10.1016/j.apsusc.2009.07.033.
(Continued)

*Primary Examiner* — Elizabeth C Imani
(74) *Attorney, Agent, or Firm* — KPPB LLP

(57) ABSTRACT

Printed textiles and related manufacturing methods are provided. Textile materials can include laced mesh fabrics made of rigid components. The laced mesh structures are designed for space applications, including but not limited to adaptive and foldable reflectors, capturing systems, debris and micrometeorite shielding, shading systems, sample capturing, and various other applications. The laced mesh structures are used in the generation of tailored, unique radio-frequency antennas and receivers that allow for active tuning/receiving capabilities. The tailored structure can also include multi-material systems mixing dielectric and conductive layers for enhanced, tunable transmission. Laced mesh structures can also be used for enhanced thermal control of components, with the ability to tailor thermal conductivity and emissivity, to create thermal engineered components via the generation of localized or global thermal response (e.g. zone thermal control).

25 Claims, 9 Drawing Sheets

(51) Int. Cl.
| | |
|---|---|
| *B22F 10/20* | (2021.01) |
| *B22F 5/10* | (2006.01) |
| *B33Y 80/00* | (2015.01) |
| *B22F 3/11* | (2006.01) |
| *B22F 7/06* | (2006.01) |

(52) U.S. Cl.
CPC ......... *B41F 15/0813* (2013.01); *B22F 3/1115* (2013.01); *B22F 5/10* (2013.01); *B22F 7/06* (2013.01); *B33Y 80/00* (2014.12)

(58) Field of Classification Search
CPC .. Y10T 428/24992; B22F 3/1055; B22F 5/10; B22F 3/1115; B22F 7/06; B32B 5/024; B41F 15/0831; B41F 15/0813
See application file for complete search history.

(56) References Cited

U.S. PATENT DOCUMENTS

| | | | |
|---|---|---|---|
| 4,173,393 A | 11/1979 | Maurer | |
| 4,202,404 A | 5/1980 | Carlson | |
| 4,711,795 A | 12/1987 | Takeuchi et al. | |
| 4,749,625 A | 6/1988 | Obayashi et al. | |
| 4,810,314 A | 3/1989 | Henderson et al. | |
| 4,812,150 A | 3/1989 | Scott | |
| 4,851,296 A | 7/1989 | Tenhover et al. | |
| 5,288,344 A | 2/1994 | Peker et al. | |
| 5,503,892 A * | 4/1996 | Callaway | D04B 21/04 15/209.1 |
| 5,772,803 A | 6/1998 | Peker et al. | |
| 6,162,130 A | 12/2000 | Masumoto et al. | |
| 6,620,264 B2 | 9/2003 | Kundig et al. | |
| 6,652,679 B1 | 11/2003 | Inoue et al. | |
| 6,771,490 B2 | 8/2004 | Peker et al. | |
| 6,843,496 B2 | 1/2005 | Peker et al. | |
| 6,887,586 B2 | 5/2005 | Peker et al. | |
| 7,073,560 B2 | 7/2006 | Kang et al. | |
| 7,075,209 B2 | 7/2006 | Howell et al. | |
| 7,357,731 B2 | 4/2008 | Johnson et al. | |
| 7,360,419 B2 | 4/2008 | French et al. | |
| 7,500,987 B2 | 3/2009 | Bassler et al. | |
| 7,883,592 B2 | 2/2011 | Hofmann et al. | |
| 7,896,982 B2 | 3/2011 | Johnson et al. | |
| 8,400,721 B2 | 3/2013 | Bertele et al. | |
| 8,613,815 B2 | 12/2013 | Johnson et al. | |
| 2002/0100573 A1 | 8/2002 | Inoue et al. | |
| 2003/0062811 A1 | 4/2003 | Peker et al. | |
| 2007/0034304 A1 | 2/2007 | Inoue et al. | |
| 2008/0099175 A1 | 5/2008 | Chu et al. | |
| 2009/0114317 A1 | 5/2009 | Collier et al. | |
| 2010/0313704 A1 | 12/2010 | Wang et al. | |
| 2012/0073710 A1 | 3/2012 | Kim et al. | |
| 2012/0077052 A1 | 3/2012 | Demetriou et al. | |
| 2013/0139964 A1 | 6/2013 | Hofmann et al. | |
| 2014/0141164 A1 | 5/2014 | Hofmann | |
| 2014/0202595 A1 | 7/2014 | Hofmann | |
| 2014/0213384 A1 | 7/2014 | Johnson et al. | |
| 2014/0224050 A1 | 8/2014 | Hofmann et al. | |
| 2014/0227125 A1 | 8/2014 | Hofmann | |
| 2014/0246809 A1 | 9/2014 | Hofmann et al. | |
| 2014/0312098 A1 | 10/2014 | Hofmann et al. | |
| 2014/0342179 A1 | 11/2014 | Hofmann et al. | |
| 2018/0043805 A1* | 2/2018 | Baek | B60N 2/5642 |

FOREIGN PATENT DOCUMENTS

| | | |
|---|---|---|
| EP | 1063312 A1 | 12/2000 |
| EP | 1138798 A1 | 10/2001 |
| EP | 1404884 B1 | 7/2007 |
| EP | 1944138 A2 | 7/2008 |
| WO | 2012031022 A2 | 3/2012 |
| WO | 2014058498 A3 | 4/2014 |

OTHER PUBLICATIONS

Liu et al., "Microstructure and Properties of Fe-Based Amorphous Metallic Coating Produced by High Velocity Axial Plasma Spraying", Science Direct, Journal of Alloys and Compounds, Apr. 23, 2009, vol. 484, pp. 300-307, doi:10.1016/j.jallcom.2009.04.086.

Liu et al., "Sliding Tribological Characteristics of a Zr-based Bulk Metallic Glass Near the Glass Transition Temperature", Tribol. Lett., Jan. 29, 2009, vol. 33, pp. 205-210, DOI 10.1007/s11249-009-9410-1.

Liu et al., "Wear Behavior of a Zr-Based Bulk Metallic Glass and Its Composites", Journal of Alloys and Compounds, May 5, 2010, vol. 503, pp. 138-144, doi:10.1016/j.jallcom.2010.04.2170.

Lupoi et al., "Deposition of Metallic Coatings on Polymer Surfaces Using Cold Spray", Science Direct, Surface & Coatings Technology, Sep. 6, 2010, vol. 205, pp. 2167-2173, doi:10.1016/j.surfcoat.2010.08.128.

Ma et al., "Wear Resistance of Zr-Based Bulk Metallic Glass Applied in Bearing Rollers", Materials Science and Engineering, May 4, 2004, vol. A386, pp. 326-330, doi:10.1016/j.msea.2004.07.054.

Maddala et al., "Effect of Notch Toughness and Hardness on Sliding Wear of $Cu_{50}Hf_{41.5}Al_{8.5}$ Bulk Metallic Glass", Scripta Materialia, Jul. 6, 2011, vol. 65, pp. 630-633, doi:10.1016/j.scriptamat.2011.06.046.

Narayan et al., "On the hardness and elastic modulus of bulk metallic glass matrix composites", Scripta Materialia, Jun. 9, 2010, vol. 63, Issue 7, pp. 768-771, doi:10.1016/j.scriptamat.2010.06.010.

Ni et al., "High Performance Amorphous Steel Coating Prepared by HVOF Thermal Spraying", Journal of Alloys and Compounds, 2009, vol. 467, pp. 163-167, doi:10.1016/j.jallcom.2007.11.133.

Nishiyama et al., "Recent progress of bulk metallic glasses for strain-sensing devices", Materials Science and Engineering: A, Mar. 25, 2007, vols. 449-451, pp. 79-83, doi:10.1016/jmsea.2006.02.384.

Oh et al., "Microstructure and tensile properties of high-strength high-ductility Ti-based amorphous matrix composites containing ductile dendrites", Acta Materialia, Sep. 23, 2011, vol. 59, Issue 19, pp. 7277-7286, doi:10.1016/j.actamat.201.08.006.

Parlar et al., "Sliding Tribological Characteristics of Zr-Based Bulk Metallic Glass", Intermetallics, Jan. 2008, vol. 16, pp. 34-41, doi:10.1016/j.intermet.2007.07.001.

Pauly et al., "Modeling Deformation Behavior of Cu—Zr—Al Bulk Metallic Glass Matrix Composites", Applied Physics Letters, Sep. 2009, vol. 95, pp. 101906-1-101906-3, doi:10.1063/1.3222973.

Pauly et al., "Transformation-mediated ductility in CuZr-based bulk metallic glasses", Nature Materials, May 16, 2010, vol. 9, Issue 6, pp. 473-477, DOI:10.1038/NMAT2767.

Ponnambalam et al., "Fe-Based Bulk Metallic Glasses With Diameter Thickness Larger Than One Centimeter", J Mater Res, Feb. 17, 2004, vol. 19, pp. 1320-1323, DOI: 10.1557/JMR.2004.0176.

Porter et al., "Incorporation of Amorphous Metals into MEMS for High Performance and Reliability", Rockwell Scientific Company, Final Report, Nov. 1, 2003, 41 pgs.

Prakash et al., "Sliding Wear Behavior of Some Fe-, Co-and Ni-Based Metallic Glasses During Rubbing Against Bearing Steel", Tribology Letters, May 1, 2000, vol. 8, pp. 153-160.

Qiao et al., "Development of plastic Ti-based bulk-metallic-glass-matrix composites by controlling the microstructures", Materials Science and Engineering: A, Aug. 20, 2010, vol. 527, Issues 29-30, pp. 7752-7756, doi:10.1016/j.msea.2010.08.055.

Ramamurty et al., "Hardness and Plastic Deformation in a Bulk Metallic Glass", Acta Materialia, Feb. 2005, vol. 53, pp. 705-717, doi:10.1016/j.actamat.20004.10.023.

Revesz et al., "Microstructure and Morphology of Cu—Zr—Ti Coatings Produced by Thermal Spray and Treated by Surface Mechanical Attrition", Science Direct, Journal of Alloys and Compounds, Jul. 14, 2011, vol. 509S, pp. S482-S485, doi:10.1016/j.jallcom.2010.10.170.

Rigney et al., "The Evolution of Tribomaterial During Sliding: A Brief Introduction", Tribol. Lett, Jul. 1, 2010, vol. 39, pp. 3-7, DOI: 10.1007/s11249-009-9498-3.

Roberts et al., "Cryogenic Charpy Impact Testing of Metallic Glass Matrix Composites", Scripta Materialia, Nov. 11, 2011, 4 pgs., doi:10.1016/j.scriptamat.2011.01.011.

(56) References Cited

OTHER PUBLICATIONS

Sanders et al., "Stability of Al-rich glasses in the Al-La-Ni system", 2006, Intermetallics, 14, pp. 348-351, doi:10.1016/j.intermet.2005.06.009.
Schuh et al., "A Survey of Instrumented Indentation Studies on Metallic Glasses", J. Mater. Res., Jan. 2004, vol. 19, No. 1, pp. 46-57.
Segu et al., "Dry Sliding Tribological Properties of Fe-Based Bulk Metallic Glass", Tribol. Lett., Apr. 28, 2012, vol. 47, pp. 131-138, DOI: 10.1007/s11249-012-9969-9.
Shen et al., "Exceptionally High Glass-Forming Ability of an Fecocrmocby Alloy", Applied Physics, Apr. 5, 2005, vol. 86, pp. 151907-1-151907-3, DOI: 10.1063/1.1897426.
Singer et al., "Wear behavior of triode-sputtered MoS2 coatings in dry sliding contact with steel and ceramics", Wear, Jul. 1996, vol. 195, Issues 1-2, pp. 7-20.
Sinmazcelik et al., "A review: Fibre metal laminates, background, bonding types and applied test methods", Materials and Design, vol. 32, Issue 7, 3671, Mar. 4, 2011, pp. 3671-3685, doi:10.1016/j.matdes.2011.03.011.
Song et al., "Strategy for pinpointing the formation of B2 CuZr in metastable CuZr-based shape memory alloys", Acta Materialia, Aug. 6, 2011, vol. 59, pp. 6620-6630, doi:10.1016/j.actamat.2011.07.017.
Sun et al., "Fiber metallic glass laminates", J. Mater. Res., Dec. 2010, vol. 25, No. 12, pp. 2287-2291, DOI: 10.1557/JMR.2010.0291.
Sundaram et al., "Mesoscale Folding, Instability, and Disruption of Laminar Flow in Metal Surfaces", Physical Review Letters, Sep. 7, 2012, vol. 109, pp. 106001-1-106001-5, DOI: 10.1103/PhysRevLett.109.106001.
Szuecs et al., "Mechanical Properties of $Zr_{56.2}Ti_{13.8}Nb_{5.0}Cu_{6.9}Ni_{5.6}Be_{12.5}$ Ductile Phase Reinforced Bulk Metallic Glass Composite", Acta Materialia, Feb. 2, 2001, vol. 49, Issue 9, pp. 1507-1513.
Tam et al., "Abrasion Resistance of Cu Based Bulk Metallic Glasses", Journal of Non-Crystalline Solids, Oct. 18, 2004, vol. 347, pp. 268-272, doi:10.1016/j. noncryso1.2004.09.008.
Tam et al., "Abrasive Wear of $Cu_{60}Zr_{30}ti_{10}$ Bulk Metallic Glass", Materials Science and Engineering, Apr. 1, 2004, vol. A384 pp. 138-142, doi:10.1016/j.msea.2004.05.73.
Tan et al., "Synthesis of La-based in-situ bulk metallic glass matrix composite", Intermetallics, Nov. 2002, vol. 10, Issues 11-12, pp. 1203-1205.
Tao et al., "Effect of Rotational Sliding Velocity on Surface Friction and Wear Behavior in Zr-Based Bulk Metallic Glass", Journal of Alloys and Compounds, Mar. 4, 2010, vol. 492, pp. L36-L39, doi:10.1016/j.jallcom.2009.11.113.
Tao et al., "Influence of Isothermal Annealing on the Micro-Hardness and Friction Property in CuZrAl Bulk Metallic Glass", Advanced Materials Research, Jan. 1, 2011, vols. 146-147, pp. 615-618, doi:10.4028/www.scientific.net/AMR.146-147.615.
Tobler et al., "Cryogenic Tensile, Fatigue, and Fracture Parameters for a Solution-Annealed 18 Percent Nickel Maraging Steel", Journal of Engineering Materials and Technology, Apr. 1, 1978, vol. 100, pp. 189-194.
Wagner, "Mechanical Behavior of 18 Ni 200 Grade Maraging Steel at Cyrogenic Temperatures", J Aircraft, Nov. 1, 1986, vol. 23, No. 10, pp. 744-749.
Wang et al., "Progress in Studying the Fatigue Behavior of Zr-Based Bulk-Metallic Glasses and Their Composites", Intermetallics, Mar. 6, 2009, vol. 17, pp. 579-590, doi:10.1016/j.intermet.2009.01.017.
Wu et al., "Bulk Metallic Glass Composites with Transformation-Mediated Work-Hardening and Ductility", Adv. Mater., Apr. 26, 2010, vol. 22, pp. 2770-2773, DOI: 10.1002/adma.201000482.
Wu et al., "Dry Sliding tribological behavior of Zr-based bulk metallic glass", Transactions of Nonferrous Metals Society of China, Jan. 16, 2012, vol. 22, Issue 3, pp. 585-589, DOI: 10.1016/S10003-6326(11)61217-X.
Wu et al., "Effects of Environment on the Sliding Tribological Behaviors of Zr-Based Bulk Metallic Glass", Intermetallics, Jan. 27, 2012, vol. 25, 115-125, doi:10.1016/j.intermet.2011.12.025.
Wu et al., "Formation of Cu—Zr—Al bulk metallic glass composites with improved tensile properties", Acta Materialia 59, Feb 19, 2011, pp. 2928-2936, doi:10.1016/j.actamat.2011.01.029.
Wu et al., "Use of rule of mixtures and metal vol. fraction for mechanical property predictions of fibre-reinforced aluminum laminates", Journal of Materials Science, vol. 29, issue 17, 4583, Jan. 1994, pp. 4583-4591.
Yin et al., "Microstructure and Mechanical Properties of a Spray-Formed Ti-Based Metallic Glass Former Alloy", Journal of Alloys and Compounds, Jan. 25, 2012, vol. 512, pp. 241-245, doi:10.1016/j.jallcom.2011-09.074.
Zachrisson et al., "Effect of Processing on Charpy Impact Toughness of Metallic Glass Matrix Composites", Journal of Materials Research, May 28, 2011, vol. 26, No. 10, pp. 1260-1268, DOI: 10.1557/jmr.2011.92.
Zhang et al., "Abrasive and Corrosive Behaviors of Cu—Zr—Al—Ag—Nb Bulk Metallic Glasses", Journal of Physics: Conference Series, 2009, vol. 144, pp. 1-4, doi:10.1088/1742-6596/1441/1/012034.
Zhang et al., "Robust Hydrophobic Fe-Based Amorphous Coating by Thermal Spraying", Applied Physics Letters, Sep. 20, 2012, vol. 101, pp. 121603-1-121603-4.
Zhang et al., "Wear Behavior of a Series of Zr-Based Bulk Metallic Glasses", Materials Science and Engineering, Feb. 25, 2008, vol. A475, pp. 124-127, doi: 10.1016/j.msea.2007.05.039.
Zhou et al., "Microstructure and Electrochemical Behavior of Fe-Based Amorphous Metallic Coatings Fabricated by Atmospheric Plasma Spraying", Journal of Thermal Spray Technology, Jan. 2011, vol. 20, No. 1-2, pp. 344-350, DOI: 10.1007/s11666-010-9570-4.
Zhu et al., "Ta-particulate reinforced Zr-based bulk metallic glass matrix composite with tensile plasticity", Scripta Materialia, Mar. 2010, vol. 62, Issue 5, pp. 278-281, doi:10.1016/j.scriptmat.2009.11.018.
Zhuo et al., "Spray Formed Al-Based Amorphous Matrix Nanocomposite Plate", Science Direct, Journal of Alloys and Compounds, Mar. 1, 2011, vol. 509, pp. L169-L173, doi:10.1016/j.jallcom.2011.02.125.
Extended European Search Report for European Application No. 14889035.3, Search completed Dec. 4, 2017, dated Dec. 13, 2017, 10 Pgs.
International Preliminary Report on Patentability for International Application PCT/US2013/047950, dated Dec. 31, 2014, dated Jan. 8, 2015, 7 Pgs.
International Preliminary Report on Patentability for International Application PCT/US2013/050614, dated Jan. 20, 2015, dated Jan. 29, 2015, 9 Pgs.
International Preliminary Report on Patentability for International Application PCT/US2014/033510, dated Oct. 12, 2016, dated Oct. 20, 2016, 9 Pgs.
International Preliminary Report on Patentability for International Application PCT/US2014/056615, dated Mar. 22, 2016, dated Mar. 31, 2016, 11 Pgs.
International Search Report and Written Opinion for International Application No. PCT/US2013/050614, Completed May 7, 2014, dated May 7, 2014, 12 pgs.
International Search Report and Written Opinion for International Application PCT/US2013/047950, completed Oct. 8, 2013, dated Oct. 10, 2013, 9 pgs.
International Search Report and Written Opinion for International Application PCT/US2014/033510, completed Jan. 8, 2015, dated Jan. 8, 2015, 11 Pgs.
International Search Report and Written Opinion for International Application PCT/US2014/056615, completed Dec. 29, 2014, dated Dec. 30, 2014, 13 Pgs.
"Corrosion of Titanium and Titanium Alloys", Total Materia., printed Feb. 16, 2016 from http://www.totalmateria.com/Article24.htm, published Sep. 2001, 4 pgs.
"Gear", Dictionary.com. Accessed Aug. 30, 2016.

(56) References Cited

OTHER PUBLICATIONS

"Group 4 element", Wikipedia. https://en.wikipedia.org/wiki/Group_4_element. Published Jun. 11, 2010. Accessed Aug. 24, 2016.
"Harmonic Drive", Wikipedia, printed Feb. 20, 2014, 4 pgs.
"Harmonic Drive AG", website, printed from http://harmoncdrive.aero/?idcat=471, Feb. 20, 2014, 2 pgs.
"Harmonic Drive Polymer GmbH", printed Feb. 20, 2014 from http://www.harmonicdrive.de/English/the-company/subsidiaries/harmonic-drive-polymer-gmbh.html, 1 pg.
"Introduction to Thermal Spray Processing", ASM International, Handbook of Thermal Spray Technology (#06994G), 2004, 12 pgs.
Abdeljawad et al., "Continuum Modeling of Bulk Metallic Glasses and Composites", Physical Review Letters, vol. 105, 205503, Sep. 17, 2010, pp. 125503-1-125503-4, DOI: 10.1103/PhysRevLett.15.125503.
Abrosimova et al., "Crystalline layer on the surface of Zr-based bulk metallic glasses", Journal of Non-Crystalline solids, Mar. 6, 2001, vol. 288, pp. 121-126.
An et al., "Synthesis of Single-Component Metallic Glasses by Thermal Spray of Nanodroplets on Amorphous Substrates", Applied Physics Letters, Jan. 26, 2012, vol. 100, pp. 041909-1-041909-4, doi:10.1063/1.3675909.
Anstis et al., "A Critical Evaluation of Indentation Techniques for Measuring Fracture Toughness: I, Direct Crack Measurements", Journal of American Ceramic Society, Sep. 1, 1981, vol. 64, No. 8, pp. 533-538.
Ashby et al., "Metallic glasses of structural materials", Scripta Materialia, Feb. 2006, vol. 54, pp. 321-326, doi:10.1016/j.scriptamat.2005.09.051.
Bakkal, "Sliding tribological characteristics of Zr-based bulk metallic glass under lubricated conditions", Intermetallics, Mar. 19, 2010, vol. 18, pp. 1251-1253, doi:10.1016/j.intermet.2010.02.003.
Bardt et al., "Micromolding three-dimensional amorphous metal structures", J. Mater. Res, Feb. 2007, vol. 22, No. 2, pp. 339-343, DOI: 10.1557/JMR.2007.0035.
Basu et al., "Laser surface coating of Fe—Cr—Mo—Y—B—C bulk metallic glass composition on AISI 4140 steel", Surface & Coatings Technology, Mar. 15, 2008, vol. 202, pp. 2623-2631, doi:10.1016/j.surfcoat.2007.09.028.
Boopathy et al., "Near-threshold fatigue crack growth in bulk metallic glass composites", J. Mater. Res., vol. 24, No. 12, pp. 3611-3619, Dec. 2009, DOI: 10.1557/fmr.2009.0439.
Branagan et al., "Wear Resistant Amorphous and Nanocomposite Steel Coatings", Met. Mater. Trans. A, Apr. 26, 2001, 32A; Idaho National Engineering and Environmental Laboratory, DOI 10.1007/s11661-001-0051-8, 15 pgs.
Cadney et al., "Cold Gas Dynamic Spraying as a Method for Freeforming and Joining Materials", Science Direct, Surface & Coatings Technology, Mar. 15, 2008, vol. 202, pp. 2801-2806, available online Oct. 17, 2007, doi: 10.1016/j.surfcoat.2007.10.010.
Calin et al., "Improved mechanical behavior of Cu—Ti-based bulk metallic glass by in situ formation of nanoscale precipitates", Scripta Materialia, Mar. 17, 2003, vol. 48, pp. 653-658.
Chen et al., "Elastic Constants, Hardness and Their Implications to Flow Properties of Metallic Glasses", Journal of Non-crystalline Solids, Sep. 1, 1975, vol. 18, pp. 157-171.
Chen et al., "Formation of Micro-Scale Precision Flexures via Molding of Metallic Glass", Proceeding of the Annual Meeting of the ASPE, Monterey, CA, 2006, pp. 283-286.
Chen et al., "Influence of laser surface melting on glass formation and tribological behaviors of $Zr_{55}Al_{10}Ni_5Cu_{30}$ alloy", J. Mater Res. Oct. 28, 2011, vol. 26, No. 20, pp. 2642-2652, DOI: 10.1157/jmr.2011.278.
Cheng et al., "Characterization of Mechanical Properties of FeCrBSiMnNbY Metallic Glass Coatings", J Mater Sci., Apr. 16, 2009, vol. 44, pp. 3356-3363, DOI: 10.1007/s10853-009-3436-5.
Cheng et al., "Correlation of the microstructure and mechanical properties of Zr-based in-situ bulk metallic glass matrix composites", Intermetallics, Sep. 24, 2010, vol. 18, Issue 12, pp. 2425-2430, doi:10.1016/j.intermet.2010.08.040.
Choi et al., "Tribological behavior of the kinetic sprayed $Ni_{59}Ti_{16}Zr_{20}Si_2Sn_3$ bulk metallic glass", Journal of Alloys and Compounds, May 31, 2007, vol. 434-435, pp. 64-67, doi:10.1016/j.jallcom.2006.08.283.
Conner et al., "Shear band spacing under bending of Zr-based metallic glass plates", Acta Materialia, Jan. 27, 2004, vol. 52, pp. 2429-2434, doi:10.1016/j.actamat.2004.01.034.
Conner et al., "Shear bands and cracking of metallic glass plates in bending", Journal of Applied Physics, Jul. 15, 2003, vol. 94, No. 2, pp. 904-911, DOI: 10.1063/1.1582555.
Dai et al., "A new centimeter-diameter Cu-based bulk metallic glass", Scripta Materialia, Jan. 20, 2006, vol. 54, pp. 1403-1408, doi:10.1016/j.scriptamat.2005.11.077.
Davis, "Hardness/Strength Ratio of Metallic Glasses", Scripta Metallurgica, Feb. 18, 1975, vol. 9, pp. 431-436.
De Beer et al., "Surface Folds Make Tears and Chips", Physics, Sep. 4, 2012, vol. 100, 3 pgs., DOI: 10.1103/Physics.5.100.
Demetriou et al., "Glassy steel optimized for glass-forming ability and toughness", Applied Physics Letters, Jul. 31, 2009, vol. 95; pp. 041907-1-041907-3; http://idx.doi.org/10.1063/1.3184792.
Dislich et al., "Amorphous and Crystalline Dip Coatings Obtained from Organometallic Solutions: Procedures, Chemical Processes and Products", Metallurgical and Protective Coatings, Mar. 6, 1981, vol. 77, pp. 129-139.
Duan et al., "Lightweight Ti-based bulk metallic glasses excluding late transition metals", Scripta Materialia, Mar. 2008, vol. 58, pp. 465-468, doi:10.1016/h,scriptamat.2007.10.040.
Duan et al., "Tribological properties of $Zr_{41.25}Ti_{13.75}Ni_{10}Cu_{12.5}Be_{22.5}$ bulk metallic glasses under different conditions", Journal of Alloys and Compounds, Mar. 2, 2012, vol. 528, pp. 74-78, doi:10.1016/j.jallcom.2012.02.104.
Fan et al., "Metallic glass matrix composite with precipitated ductile reinforcement", Applied Physics Letters, Aug. 5, 2002, vol. 81, Issue 6, pp. 1020-1022, DOI: 10.1063/1.1498864.
Fleury et al., "Tribological properties of bulk metallic glasses", Materials Science and Engineering, Jul. 2004, vol. A375-377, pp. 276-279, doi:10.1016/j.msea.2003.10.065.
Fornell et al., "Enhanced mechanical properties and in vitro corrosion behavior of amorphous and devitrified $Ti_{40}Zr_{10}Cu_{38}Pd_{12}$ metallic glass", Journal of the Mechanical Behavior of Biomedical Materials, May 27, 2011, vol. 4, pp. 1709-1717, doi:10.1016/j.jmbbm.2011.05.028.
Fu et al., "Sliding behavior of metallic glass Part I. Experimental investigations", Wear, Oct. 2001, vol. 250, pp. 409-419.
Ganesan et al., "Bonding Behavior Studies of Cold Sprayed Copper Coating on the PVC Polymer Substrate", Surface & Coatings Technology, Jul. 10, 2012, vol. 207, pp. 262-269.
Garrett et al., "Effect of microalloying on the toughness of metallic glasses", Applied Physics Letter, Dec. 12, 2012, vol. 101, 241913-1-241913-3, http://dx.doi.org/10.1063/1.47699997.
Gleason Corporation, "Gear Product News", Introducing genesis, The Next Generation in Gear Technology, Apr. 2006, 52 pgs.
Gloriant, "Microhardness and abrasive wear resistance of metallic glasses and nanostructured composite materials", Journal of Non-Crystalline Solids, Feb. 2003, vol. 316, pp. 96-103.
Greer, "Partially or fully devitrified alloys for mechanical properties", Materials and Science and Engineering, May 31, 2001, vol. A304, pp. 68-72.
Greer et al., "Wear resistance of amorphous alloys and related materials", International Materials Reviews, Apr. 1, 2002, vol. 47, No. 2, pp. 87-112, DOI: 10.1179/095066012225001067.
Ha et al., "Tensile deformation behavior of two Ti-based amorphous matrix composites containing ductile β dendrites", Materials Science and Engineering: A, May 28, 2012, vol. 552, pp. 404-409, http://dx.doi.org/10.1016/j.msea.2012.05.061.
Hale, "Principles and Techniques for Designing Precision Machines", Ph.D. Thesis, Feb. 1999, 493 pgs.
Harmon et al., "Anelastic to Plastic Transition in Metallic Glass-Forming Liquids", Physical Review Letters, Sep. 28, 2007, vol. 99, 135502-1-135502-4, DOI: 10.1103/PhysRevLett.99.135502.

(56) References Cited

OTHER PUBLICATIONS

Haruyama et al., "Volume and enthalpy relaxation in $Zr_{55}Cu_{30}Ni_5Al_{10}$ bulk metallic glass", Acta Materialia, Mar. 2010, vol. 59, pp. 1829-1836, doi:10.1016/jactamat.2009.11.025.

Hays et al., "Microstructure Controlled Shear Band Pattern Formation and Enhanced Plasticity of Bulk Metallic Glasses Containing in situ Formed Ductile Phase Dendrite Dispersions", Physical Review Letters, Mar. 27, 2000, vol. 84, pp. 2901-2904.

Hejwowski et al., "A Comparative Study of Electrochemical Properties of Metallic Glasses and Weld Overlay Coatings", Vacuum, Feb. 2013, vol. 88, pp. 118-123, doi:10.1016/j.vacuum.2012.02.031.

Hofmann, "Bulk Metallic Glasses and Their Composites: A Brief History of Diverging Fields", Journal of Materials, Jan. 2013, vol. 2013, 7 pgs., http://dx.doi.org/10.1155/2013/517904.

Hofmann, "Shape Memory Bulk Metallic Glass Composites", Science, Sep. 10, 2010, vol. 329, pp. 1294-1295.

Hofmann et al., "Designing metallic glass matrix composites with high toughness and tensile ductility", Nature Letters, Feb. 28, 2008, vol. 451, pp. 1085-1090, doi:10.1038/nature06598.

Hofmann et al., "Development of tough, low-density titanium-based bulk metallic glass matrix composites with tensile ductility", PNAS, Dec. 23, 2008, vol. 105, pp. 20136-20140, www.phas.orgdgidoi/10.1073/pnas.0809000106.

Hofmann et al., Improving Ductility in Nanostructured Materials and Metallic Glasses: "Three Laws", Material Science Forum, 2010, vols. 633-634, pp. 657-663, published online Nov. 19, 2009, doi:10.4028/www.scientific.net/MSF.633-634.657.

Hofmann et al., "Semi-solid Induction Forging of Metallic Glass Matrix Composites", JOM, Dec. 2009, vol. 61, No. 12, pp. 11-17, plus cover.

Hong et al., "Microstructural Characteristics of High-Velocity Oxygen-Fuel (HVOF) Sprayed Nickel-Based Alloy Coating", Journal of Alloys and Compounds, Jul. 26, 2013, vol. 581, pp. 398-403, http://dx.doi.org/10.1016/j.jallcom.2013.07.109.

Hu et al., "Crystallization Kinetics of the Cu47.5Zr74.5Al5 Bulk Metallic Glass under Continuous and Iso-thermal heating", Applied Mechanics and Materials, Sep. 8, 2011, vols. 99-100, pp. 1052-1058, doi:10.4028/www.scientific.net/AMM.99-100.1052.

Huang et al., "Dendritic microstructure in the metallic glass matrix composite $Zr_{56}Ti_{14}Nb_5Cu_7Ni_6Be_{12}$", Scripta Materialia, Mar. 29, 2005, vol. 53, pp. 93-97, doi:10.1016/j.scriptamat.2005.03.005.

Huang et al., "Fretting wear behavior of bulk amorphous steel", Intermetallics, Jun. 12, 2011, vol. 19, pp. 1385-1389, doi:10.1016/j.intermet.2011.04.014.

Inoue et al., "Cobalt-based bulk glassy alloy with ultrahigh strength and soft magnetic properties", Nature Materials, Oct. 21, 2003, vol. 2, pp. 661-663, doi:10.1038/nmat982.

Inoue et al., "Development and applications of late transition metal bulk metallic glasses", Bulk Metallic Glasses, pp. 1-25, 2008.

Inoue et al., "Developments and applications of bulk metallic glasses", Reviews on Advanced Materials Science, Feb. 28, 2008, vol. 18, pp. 1-9.

Inoue et al., "Preparation of 16 mm Diameter Rod of Amorphous $Zr_{65}Al_{7.5}Ni_{10}Cu_{17.5}$ Alloy", Material Transactions, JIM, 1993, vol. 34, No. 12, pp. 1234-1237.

Inoue et al., "Recent development and application products of bulk glassy alloys", Acta Materialia, Jan. 20, 2011, vol. 59, Issue 6, pp. 2243-2267, doi:10.1016/j.actamat.2010.11.027.

Ishida et al., "Wear Resistivity of Super-Precision Microgear Made of Ni-Based Metallic Glass", Materials Science and Engineering, Mar. 25, 2007, vol. A449-451, pp. 149-154, doi:10.1016/j.msea.2006.02.300.

Jiang et al., "Low-Density High-Strength Bulk Metallic Glasses and Their Composites: A Review", Advanced Engineering Materials, Nov. 19, 2014, pp. 1-20, DOI: 10.1002/adem.201400252.

Jiang et al., "Tribological Studies of a Zr-Based Glass-Forming Alloy with Different States", Advanced Engineering Materials, Sep. 14, 2009, vol. 1, No. 11, pp. 925-931, DOI: 10.1002/adem.200900184.

Kahraman et al., "A Feasibility Study on Development of Dust Abrasion Resistant Gear Concepts for Lunar Vehicle Gearboxes", NASA Grant NNX07AN42G Final Report, Mar. 11, 2009, 77 pgs.

Kim et al., "Amorphous Phase Formation of Zr-Based Alloy Coating by HVOF Spraying Process", Journal of Materials Science, Jan. 1, 2001, vol. 36, pp. 49-54.

Kim et al., "Design and synthesis of Cu-based metallic glass alloys with high glass forming ability", Journal of Metastable and Nanocrystalline Materials, Sep. 1, 2005, vols. 24-25, pp. 93-96, doi:10.4028/www.scientific.net/JMNM.24-25.93.

Kim et al., "Enhancement of Metallic Glass Properties of Cu-Based BMG Coating by Shroud Plasma Spraying", Science Direct, Surface & Coatings Technology, Jan. 25, 2011, vol. 205, pp. 3020-3026, doi:10.1016/j.surfcoat.2010.11.012.

Kim et al., "Oxidation and Crystallization Mechanisms in Plasma-Sprayed Cu-Based Bulk Metallic Glass Coatings", Acta Materialia., Feb. 1, 2010, vol. 58, pp. 952-962, doi:10.1016/j.actamat.2009.10.011.

Kim et al., "Production of $Ni_{65}Cr_{15}P_{16}B_4$ Metallic Glass-Coated Bipolar Plate for Fuel Cell by High Velocity Oxy-Fuel (HVOF) Spray Coating Method", The Japan Institute of Metals, Materials Transactions, Aug. 25, 2010, vol. 51, No. 9, pp. 1609-1613.

Kim et al., "Realization of high tensile ductility in a bulk metallic glass composite by the utilization of deformation-induced martensitic transformation", Scripta Materialia, May 3, 2011, vol. 65, pp. 304-307, doi:10.1016/j.scriptamat.2011.04.037.

Kim et al., "Weldability of $Cu_{54}Zr_{22}Ti_{18}Ni_6$ bulk metallic glass by ultrasonic welding processing", Materials Letters, May 17, 2014, vol. 130, pp. 160-163, http://dx.doi.org/10.1016/j.matlet.2014.05.056.

Kobayashi et al., "Fe-Based Metallic Glass Coatings Produced by Smart Plasma Spraying Process", Materials Science and Engineering, 2007, vol. B148, pp. 110-113, doi:10.1016/j.mseb.2007.09.035.

Kobayashi et al., "Mechanical Property of Fe-Base Metallic Glass Coating Formed by Gas Tunnel Type Plasma Spraying", ScienceDirect, Surface & Coatings Technology, (2007), 6 pgs., doi:10.1016/j.surfcoat.2007.09.011.

Kobayashi et al., "Property of Ni-Based Metallic Glass Coating Produced by Gas Tunnel Type Plasma Spraying", International Plasma Chemistry Society, ISPC 20, 234, Philadelphia, USA, Jul. 24, 2011, Retrieved from: http://www.ispc-conference.org/ispcproc/ispc20/234.pdf.

Kong et al., "Effect of Flash Temperature on Tribological Properties of Bulk Metallic Glasses", Tribol. Lett., Apr. 25, 2009, vol. 35, pp. 151-158, DOI 10.1007/s11249-009-9444-4.

Kozachkov et al., "Effect of cooling rate on the volume fraction of B2 phases in a CuZrAlCo metallic glass matrix composite", Intermetallics, Apr. 19, 2013, vol. 39, pp. 89-93, http://dx.org/10.1016/j.intermet.2013.03.017.

Kuhn et al., "Microstructure and mechanical properties of slowly cooled Zr—Nb—Cu—Ni—Al composites with ductile bcc phase", Materials Science and Engineering: A, Jul. 2004, vol. 375-377, pp. 322-326, doi:10.1016/j.msen.2003.10.086.

Kuhn et al., "ZrNbCuNiAl bulk metallic glass matrix composites containing dendritic bcc phase precipitates", Applied Physics Letters, Apr. 8, 2002, vol. 80, No. 14, pp. 2478-2480.

Kumar et al., "Bulk Metallic Glass: The Smaller the Better", Advanced Materials, Jan. 25, 2011, vol. 23, pp. 461-476, doi: 10.1002/adma.201002148.

Kwon et al., "Wear Behavior of Fe-Based Bulk Metallic Glass Composites", Journal of Alloys and Compounds, Jul. 14, 2011, vol. 509S, pp. S105-S108, doi:10.1016/j.jallcom.2012.12.108.

Launey et al., "Fracture toughness and crack-resistance curve behavior in metallic glass-matrix composites", Applied Physics Letters, Jun. 18, 2009, vol. 94, pp. 241910-1-241910-3, DOI: 10.1063/1.3156026.

Launey et al., "Solution to the Problem of the Poor Cyclic Fatigue Resistance of Bulk Metallic Glasses", PNAS Early Edition, pp. 1-6, Jan 22, 2009, www.pnas.org/cgi/doi/10.1073/pnas.0900740106.

Lee et al., "Effect of a controlled volume fraction of dendritic phases on tensile and compressive ductility in La-based metallic glass matrix composites", Acta Materialia, vol. 52, Issue 14, Jun. 17, 2004, pp. 4121-4131, doi:10.1016/j.actamat.2004.05.025.

(56) References Cited

OTHER PUBLICATIONS

Lee et al., "Nanomechanical properties of embedded dendrite phase and its influence on inelastic deformation of $Zr_{55}Al_{10}Ni_5Cu_{30}$ glassy alloy", Materials Science and Engineering A, Mar. 25, 2007, vol. 375, pp. 945-948, doi:10.1016/j.msea.2006.02.014.

Li et al., "Wear Behavior of Bulk $Zr_{41}Ti_{14}Cu12.5Ni_{10}Be_{22.5}$ Metallic Glasses", J. Mater. Res., Aug. 2002, vol. 17, No. 8, pp. 1877-1880.

Lillo et al., "Microstructure, Processing, Performance Relationships for High Temperature Coatings", U.S. Department of Energy, Office of Fossil Energy, under DOE Idaho Operations Office, Contract DE-AC07-05ID14517; Jul. 1, 2008, 22nd Annual Conference on Fossil Energy Materials, Pittsburgh, U.S., 8 pgs.

List et al., "Impact Conditions for Cold Spraying of Hard Metallic Glasses", Journal of Thermal Spray Technology, Jun. 1, 2012, vol. 21, No. 3-4, pp. 531-540, DOI: 10.1007/s11666-012-9750-5.

Liu et al., "Influence of Heat Treatment on Microstructure and Sliding Wear of Thermally Sprayed Fe-Based Metallic Glass Coatings", Tribol. Lett., Mar. 4, 2012, vol. 46, pp. 131-138, DOI: 10.1007/s11249-012-9929-4.

\* cited by examiner

MULTI-FUNCTIONAL TEXTILE AND RELATED METHODS OF MANUFACTURING

CROSS-REFERENCE TO RELATED APPLICATIONS

The current application claims the benefit of and priority under 35 U.S.C. § 119(e) to U.S. Provisional Patent Application No. 62/513,267 entitled "Multifunction 3-D Printed Space Fabrics," filed May 31, 2017. The disclosure of U.S. Provisional Patent Application No. 62/513,267 is hereby incorporated by reference in its entirety for all purposes.

STATEMENT REGARDING FEDERALLY SPONSORED RESEARCH

The invention described herein was made in the performance of work under a NASA contract NNN12AA01C, and is subject to the provisions of Public Law 96-517 (35 USC 202) in which the Contractor has elected to retain title.

FIELD OF THE INVENTION

The present invention generally relates to textile and, more specifically, to printed textile for space applications.

BACKGROUND

In materials engineering, materials having reduced fabrication and transportation costs yet still being functional for relevant applications are highly desired. In space applications, materials often require exceptional performance in terms of thermal, optical, mechanical, chemical, and electrical properties. As such, potential uses of metal alloys and composites for aerospace applications have been heavily investigated. New advances in nanotechnology engineering and self-assembling nanostructures have allowed for significant breakthroughs and advantages for such materials. Recently, additive manufacturing techniques have been explored as alternative manufacturing methods for their cost-effectiveness and fabrication capabilities.

Additive manufacturing, also known as 3D printing, refers to processes that allow for the fabrication of three-dimensional objects using a digital file. Unlike subtractive manufacturing that starts with a solid block of material from which excess material is removed to create a finished part, additive manufacturing typically utilizes a direct deposition method to build up a part layer by layer in accordance with a predefined design model, resulting in minimal or no waste material. Traditionally, material is directly deposited onto the part being printed and is then solidified. This deposition and solidification process repeats until a three-dimensional part is created. Depending on the material being utilized, a solidification element may be employed. Iterative layers of deposited and solidified material collectively create additively manufactured part(s).

SUMMARY OF THE INVENTION

One embodiment includes a printed textile fabric including a plurality of textile cells, each textile cell having a cell body including a thermal absorbing side and a thermal radiating side including a plurality of lacing elements, wherein the surface area of the thermal radiating side is higher than the thermal absorbing side and each of the plurality of textile cells is capable of linking with another textile cell through the plurality of lacing elements.

In another embodiment, the plurality of lacing elements includes a plurality of lacing rings.

In a further embodiment, the thermal absorbing side defines a plane that intersects at least two points on the thermal absorbing side and the plurality of lacing rings are configured to extend out of the plane on the side of the cell body opposite the thermal absorbing side at an acute angle relative to the plane.

In still another embodiment, the printed textile fabric further includes at least one support ring disposed above the plane and parallel thereto, the at least one support ring being interconnected with each of the plurality of lacing rings.

In a still further embodiment, the printed textile fabric further includes a plurality of support pillars extending out of the plane, each support pillar being interconnected with at least two of the plurality of lacing rings.

In yet another embodiment, the plurality of support pillars are disposed at the corners of their respective textile cell.

In a yet further embodiment, the printed textile fabric further includes a plurality of support pillars extending out of the plane, each support pillar being interconnected with at least two of the plurality of lacing rings and the support ring.

In another additional embodiment, the plurality of support pillars are disposed at the corners of their respective textile cell.

In a further additional embodiment, the thermal absorbing side is about 7 mm wide by about 7 mm long and each of the lacing rings has a ring thickness between about 0.8 mm to about 1.5 mm.

In another embodiment again, the lacing rings have non-identical thicknesses with each other.

In a further embodiment again, each of the lacing elements is fully enclosed.

In still yet another embodiment, the plurality of textile cells is made of a polymer.

In a still yet further embodiment, the plurality of textile cells is coated with a metal.

In still another additional embodiment, the plurality of textile cells is made of carbon fiber reinforced nylon.

In a still further additional embodiment, the plurality of textile cells is made of a low-outgassing and $O_3$ resistant material.

In still another embodiment again, the thermal absorbing side includes a reflective material layer.

In a still further embodiment again, multiple cell bodies are interconnected together through interlinked lace rings.

In yet another additional embodiment, each adjacent cell body is interconnected via a pair of interlinked lacing rings, one lace ring of the pair being disposed on each of the cell bodies.

In a yet further additional embodiment, the plurality of lacing rings are encased within the cell body.

In yet another embodiment again, the lacing rings are disposed at angles relative to the plane that are non-identical.

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as exemplary embodiments of the invention and should not be construed as a complete recitation of the scope of the invention.

DETAILED DESCRIPTION

Figure 1A:
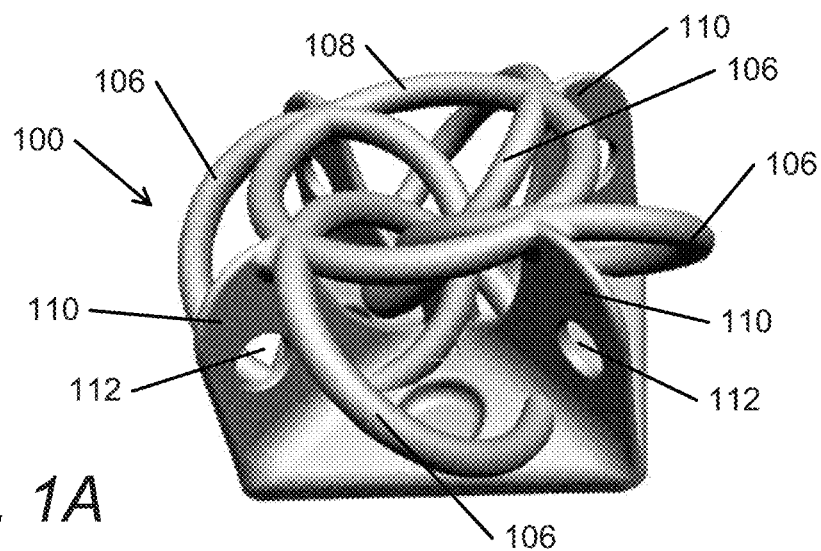
FIG. 1A conceptually illustrates a perspective view of a textile cell in accordance with an embodiment of the invention.
Figure 1B:
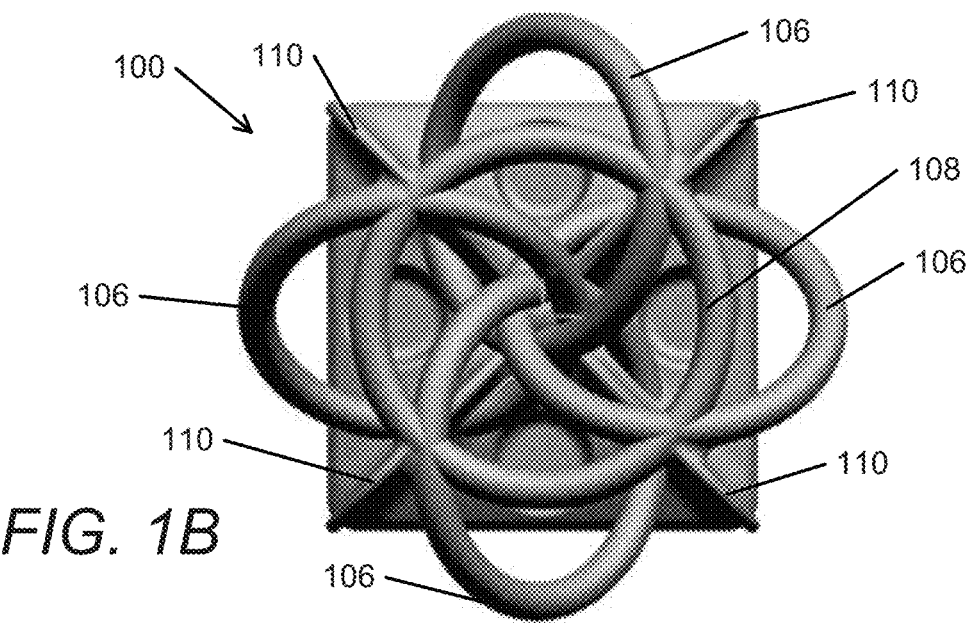
FIG. 1B conceptually illustrates a top view of a textile cell in accordance with an embodiment of the invention.
Figure 1C:
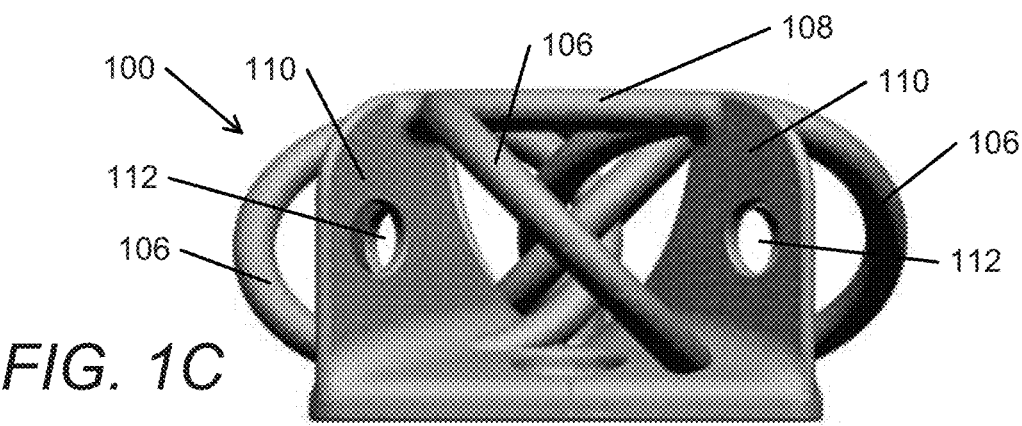
FIG. 1C conceptually illustrates a side view of a textile cell in accordance with an embodiment of the invention.

Turning now to the drawings, printed textiles and related manufacturing methods are illustrated. Textile materials in accordance with many embodiments of the invention can include laced mesh fabrics made of rigid components. Such materials can be used for many applications. In many embodiments, the laced mesh fabrics are designed for space applications, including but not limited to adaptive and foldable reflectors, capturing systems, debris and micrometeorite shielding, shading systems, sample capturing, and various other applications. In some embodiments, the laced mesh fabrics are used in the generation of tailored, unique radio-frequency antennas and receivers that allow for active tuning/receiving capabilities. The tailored structure can also include multi-material systems mixing dielectric and conductive layers for enhanced, tunable transmission. Laced mesh fabrics in accordance with various embodiments of the invention can also be used for enhanced thermal control of components (with the ability to tailor thermal conductivity and emissivity) to create thermal engineered components via the generation of localized or global thermal response (e.g. zone thermal control). Similarly, the structures can also be used to tailor electrical conductivity to generate a structure with controlled conductivity (or resistivity) in the as-built configuration, which allows for the generation of inherent conductive paths in a multi-functional member.

In various embodiments, the laced mesh fabric is composed of rigid, repeatable textile cells. Such modular designs can be implemented in a variety of ways, including the use of soft design architectures. In many embodiments, the textile cell includes a thermal radiating side and a thermal absorbing side. In several embodiments, the thermal radiating side includes components that can allow for each textile cell to chain or link with other textile cells. In a number of embodiments, the textile cell is designed with at least four lacing elements, where each lacing element is capable of chaining or linking the textile cell with another textile cell.

The textile cell can be designed to incorporate different functions, individually and/or when chained as a lace mesh fabric. For example, the linking nature of textile cells can form a laced mesh fabric with high foldability despite the rigid structure of the individual textile cells. High foldability can increase the compatibility of the material in a variety of applications, such as allowing the shape to be responsive to different geometrical configurations. Additionally, high foldability can help reduce transportation costs. Other functions can also be integrated with the textile cell design to increase various qualities and to allow for different functions, such as but not limited to structural tensile integrity, thermal dissipation, thermal conductivity, and reflectivity. A generative design approach can be taken along with a synthetic approach towards the combination of functions to develop custom designs based on the requirements of a given application. Algorithmic approaches can allow for the design of multiple configurations using different geometries based on a given set of requirements. By integrating multiple functions within one component, the material can be multi-functional with regards to one application and/or can be repurposed for other applications.

Textile cells can be made of various types of materials, including but not limited to metals, polymers, various types of alloys, and multi-material composites. Different manufacturing methods can also be used. The specific type of manufacturing method used can depend on the type of material selected, In many embodiments, additive manufacturing techniques are used to print the textile cells. Additive manufacturing techniques allow the textile cells to be fabricated with a unibody construction, which in turn allows for complex geometries while maintaining adequate structural integrity. For example, in some embodiments, the textile cell is of a unibody construction with a plurality of lacing elements seamlessly connected. Additive manufacturing techniques also allow for the textile cells to be printed in a linked configuration, essentially allowing for the printing of the laced mesh fabric. In a number of embodiments, plating techniques are utilized in conjunction with additive manufacturing. Textile cell geometries, functions, and manufacturing methods are discussed below in further detail.

Textile Cell Geometries

Textile cells in accordance with various embodiments of the invention can contain many different geometries. In many embodiments, the textile cells are designed to be modular, repeatable structures. Such designs can be implemented with textile cells containing lacing elements that can chain with one another to create a network of textile cells. In some applications, the textile cell contains at least four integrated lacing elements for chaining with other textile cells. The textile cell can be manufactured using additive manufacturing processes, allowing the textile cell to be a monolithic structure with the lacing elements seamlessly connected.

In many embodiments, the textile cell is designed with a thermal management system where is absorbed on one side and radiated out of the other side. One way to implement such a system is to design the textile cell with one side that functions as a heat sink, allowing that side to dissipate heat effectively. In some embodiments, the textile cell is designed with a planar or curved side and an opposite side designed to have a high surface area for radiating heat.

Figure 1D:
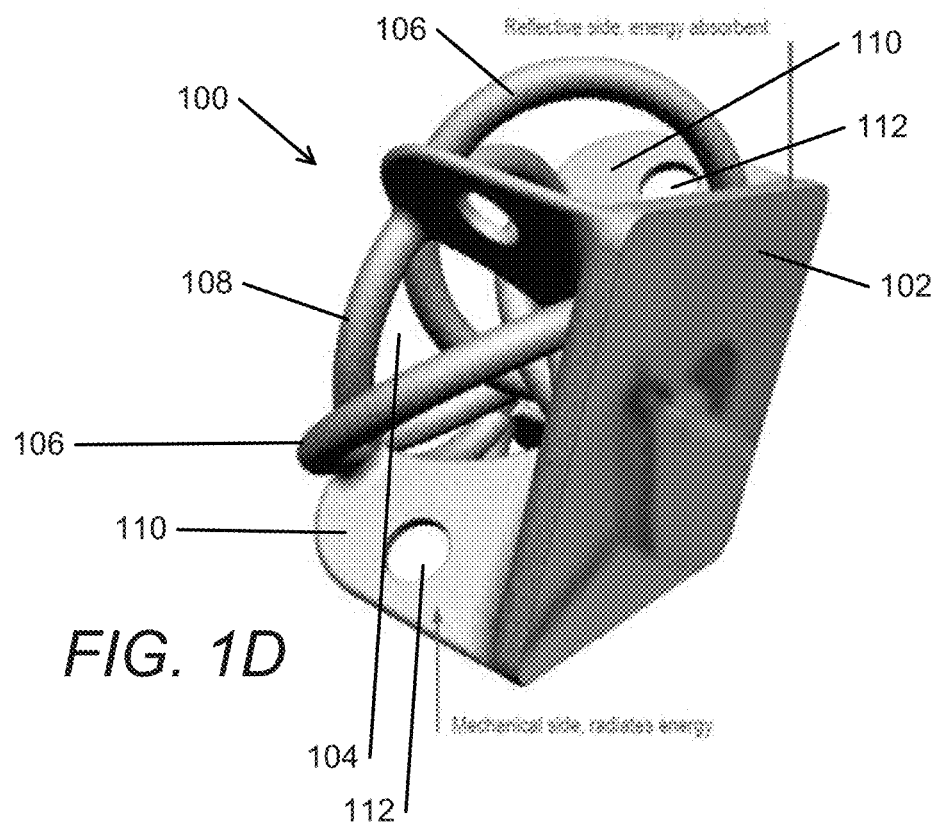
FIG. 1D conceptually illustrates a perspective view of a textile cell showing a thermal absorbing side and a thermal radiating side in accordance with an embodiment of the invention.

Multiple views of a textile cell with a multi-functional design in accordance with an embodiment of the invention is conceptually illustrated in FIGS. 1A-1E. In the illustrative embodiment, the textile cell 100 is designed with thermal management capabilities. As shown, this can be implemented by designing the textile cell 100 to have a thermal absorbing side 102 and a thermal radiating side 104. FIG. 1D shows a perspective view of the textile cell 100 that illustrates the thermal absorbing side 102 and the thermal radiating side 104. The thermal absorbing side 102 can be designed to absorb electromagnetic radiation while the thermal radiating side 104 can be designed to radiate the absorbed energy. In many embodiments, the thermal absorbing side 102 is designed to receive a specific spectral band of electromagnetic radiation. In the illustrative embodiment, the thermal absorbing side 102 is implemented as a flat planar surface. In other embodiments, the thermal absorbing side can have a variety of different geometries including but not limited to convex and concave surfaces.

A thermal radiating side of a textile cell can be designed to effectively dissipate heat by having a large surface area, effectively functioning as a heatsink. In the illustrative embodiment of FIGS. 1A-1E, the thermal radiating side 104 is designed to have numerous features and components. These features and components can each serve a different and/or even multiple functions. For example, in the illustrative embodiment, the thermal radiating side 104 includes four lacing elements 106 implemented using lacing rings, which can serve multiple purposes. Primarily, the lacing elements 106 can be used to lace or chain together multiple textile cells. Given an imaginary plane defined by the planar surface of the thermal absorbing side 102, the lacing elements 106 are formed at an acute angle from the plane on the thermal radiating side 104. This angle can be adjusted and can affect the adaptability of a laced mesh fabric that is formed from the textile cells. In the illustrative embodiment, the lacing elements 106 are connected with the entirety of the textile cell 100. This connection allows the lacing elements 106 to increase the surface area of the thermal radiating side 104 from which electromagnetic radiation/heat absorbed on the thermal absorbing side 102 can radiate.

Figure 1E:
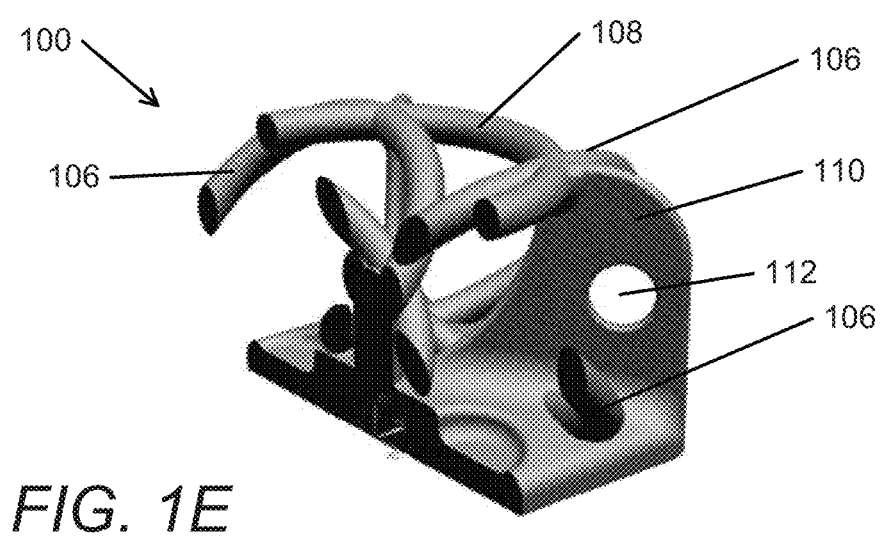
FIG. 1E conceptually illustrates a section of a textile cell sliced by a plane in accordance with an embodiment of the invention.

In addition to lacing elements 106, the thermal radiating side 104 of FIGS. 1A-1E also includes a support ring 108 disposed at a parallel offset to a plane define in whole or in part by the thermal absorbing side 102. In the illustrative embodiment, the support ring 108 is seamlessly connected to the lacing elements 106 in a way and position such that the structure of the support ring 108 increases the structural integrity of the textile cell 100 during tensile loads. Additionally, the support ring 108 can also contribute to an increase in surface area of the thermal radiating side 104. The thermal radiating side 104 of the textile cell 100 also includes four support pillars 110 implemented as support planes formed normal to the plane defined in whole or in part by the thermal absorbing side 102. In the illustrative embodiment, the support pillars 110 are each interconnected with two lacing elements 106 and the support ring 108 (as shown in FIG. 1E). FIG. 1E shows the section of the textile cell 100 cut by a plane perpendicular to the plane defined in whole or in part by the thermal absorbing side 102. In addition to providing mechanical and structural support for the textile cell, the support pillars 110 provide additional surface area for radiating heat. In the illustrative embodiment, the support pillars 110 also each defines a hole 112 strategically placed so as to not adversely affect the structural support that the support pillar 110 provides while providing other functions, such as but not limited to lowering the total weight of the textile cell 100.

Figure 2A:
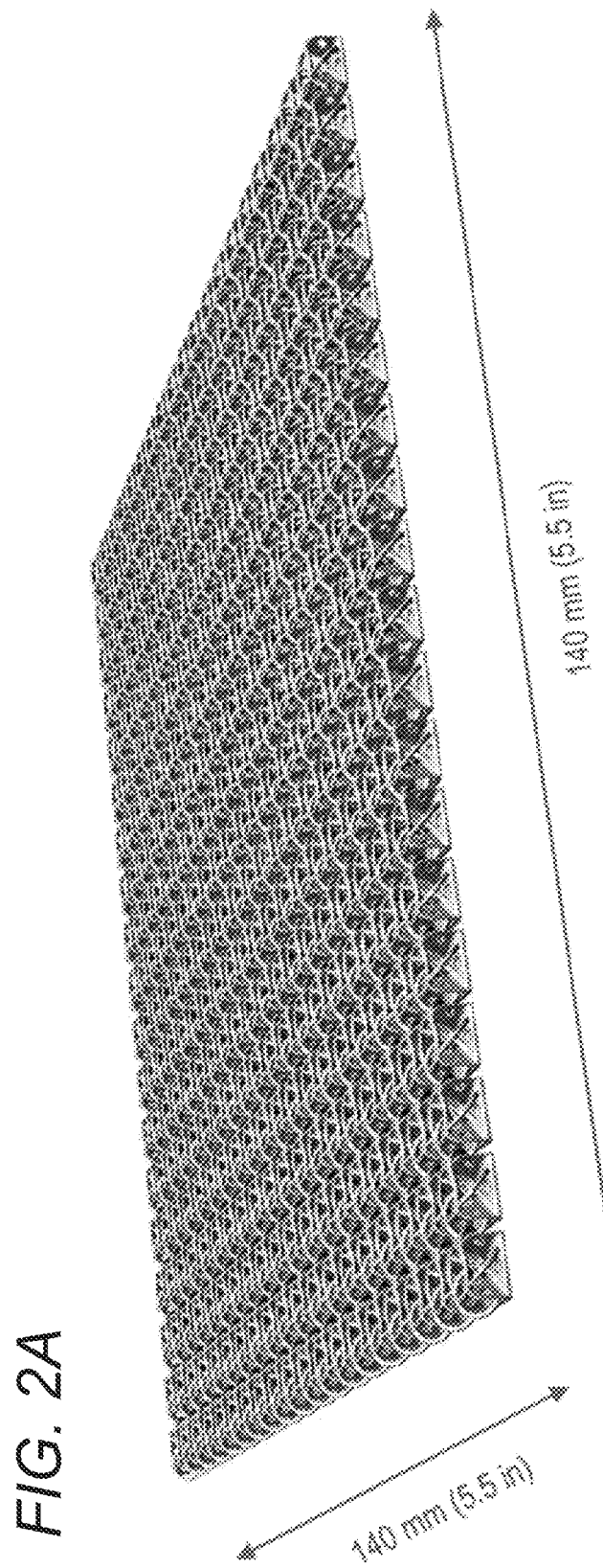
FIG. 2A conceptually illustrates a laced mesh fabric composed of chained textile cells in accordance with an embodiment of the invention.
Figure 2B:
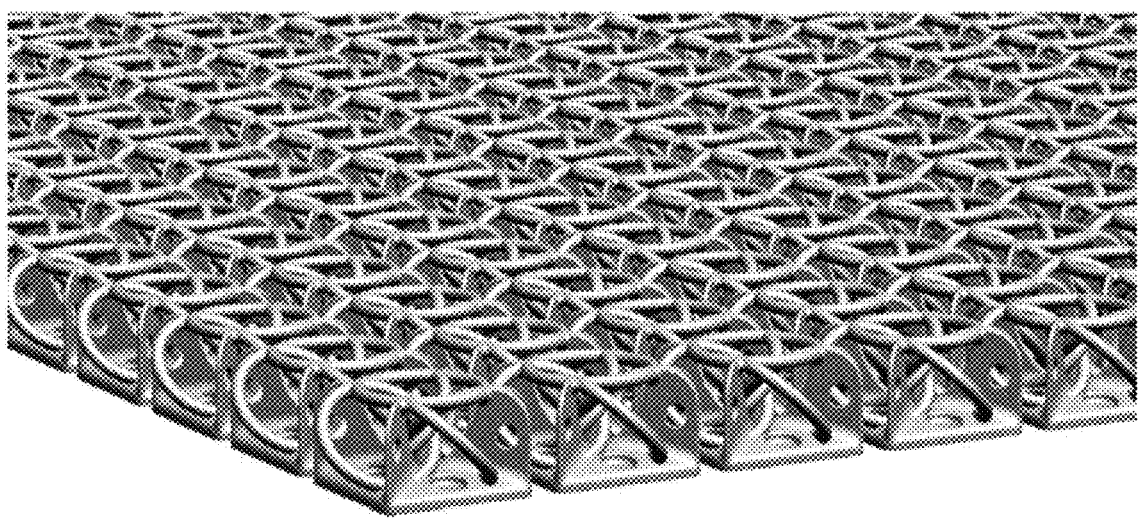
FIG. 2B-2C show close-ups a laced mesh fabric and its lacing elements in accordance with an embodiment of the invention.
Figure 2C:
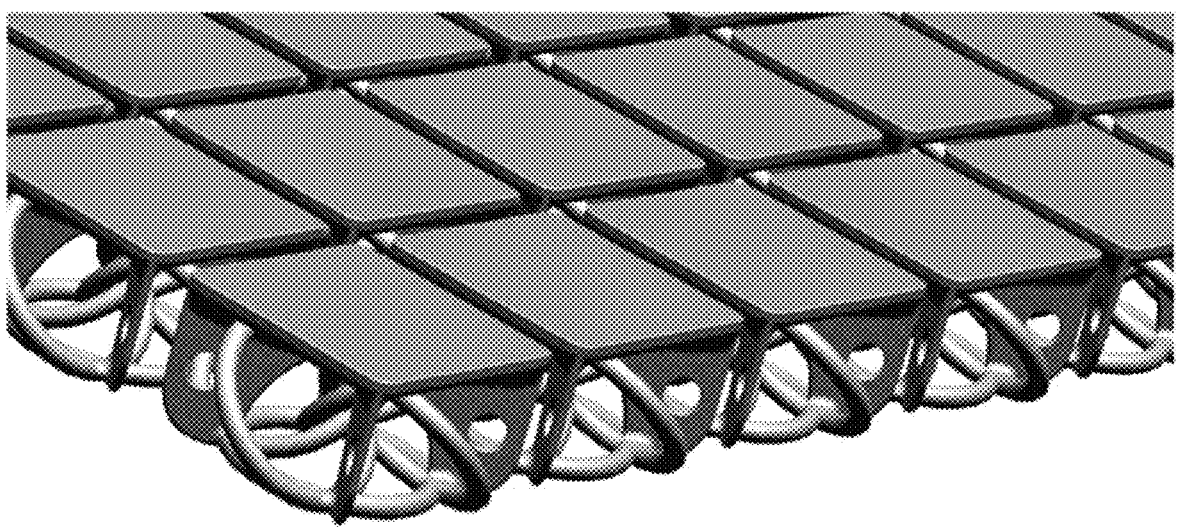

FIG. 2A conceptually illustrates a laced mesh fabric composed of chained textile cells in accordance with an embodiment of the invention. In the illustrative embodiment, each textile cell is designed with lacing elements for chaining with four other textile cells to form the laced mesh fabric. FIGS. 2B and 2C show close-ups of the laced mesh fabric with the lacing elements facing up and down, respectively.

Textile cells and lacing elements can be designed to have different configurations and dimensions. In many embodiments, the textile cell does not include any support rings or pillars. In some embodiments, the lacing elements are rings formed at an angle with respect to the plane defined in whole or in part by a thermal absorbing side of the textile cell. The angle at which the lacing elements are formed can vary among textile cells and can also vary within each textile cell. The lacing elements can have varying diameters and thicknesses. In some embodiments, the lacing elements are non-uniform with respect to their angles, ring diameters, and/or ring thicknesses within the textile cell. In a number of embodiments, the lacing elements have thicknesses ranging from about 0.5 mm to about 2 mm with the textile cell having maximum dimensions of about 7 mm×7 mm×4.5 mm. As can readily be appreciated, textile cells in accordance with various embodiments of the invention can have dimensions as large or small as allowed by the specific manufacturing process utilized. As such, any dimensions mentioned in this disclosure can be scaled up or down to produce a textile cell design embodiments in accordance with the invention.

Figure 3A:
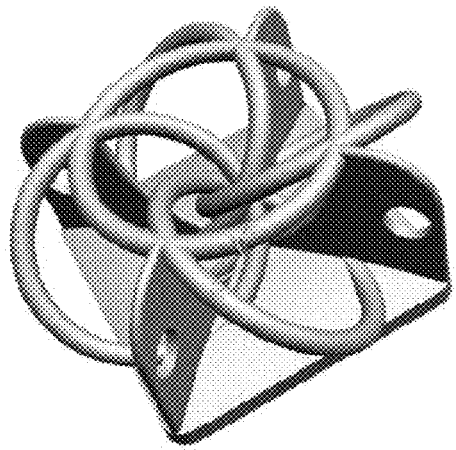
FIGS. 3A-3D conceptually illustrate four different textile cell geometries in accordance with various embodiments of the invention.
Figure 3B:
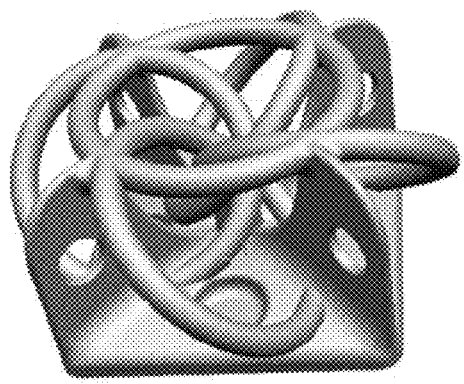
Figure 3C:
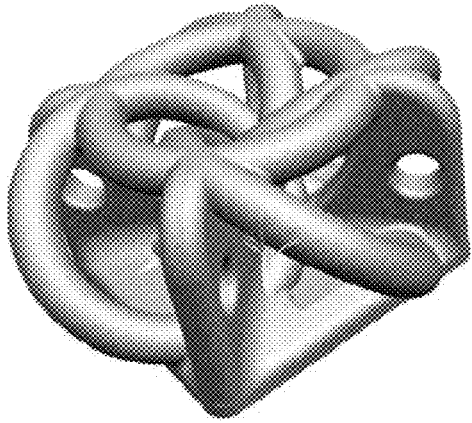
Figure 3D:
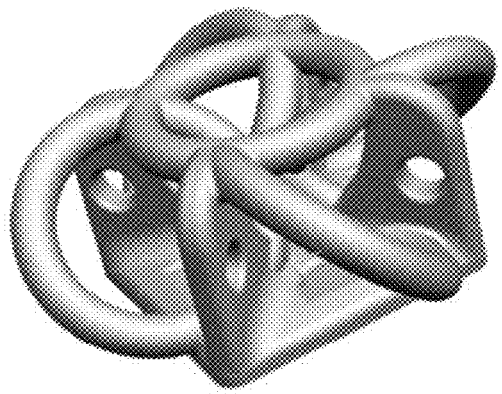

FIGS. 3A-3D conceptually illustrate four different textile cell geometries in accordance with various embodiments of the invention. FIG. 3A shows a textile cell 300 with lacing elements 302 each having a ring thickness of 0.8 mm. FIG. 3C shows a textile cell 310 with lacing elements 312 each having a ring thickness of 1 mm. FIG. 3D shows a textile cell 320 with lacing elements 322 each having a ring thickness of 1.5 mm. In the illustrative embodiments, each of the textile cells 300, 310, and 320 has a planar side with a width of 7 mm and a length of 7 mm. The textile cells 300, 310, and 320 are all 4.5 mm high. As shown, the textile cells 300, 310, and 320 also include support pillars 306, 316, 326 of varying thicknesses and diameters. Each of the textile cells 300, 310, and 320 also includes a support ring 304, 314, and 324 having similar dimensions to its respective lacing elements 302, 312, and 322. Support rings can vary in dimensions that can be independent of the dimensions of the lacing elements. Furthermore, the lacing elements can be non-uniform. FIG. 3D conceptually illustrates a textile cell 330 with lacing elements 332 and a support ring 334 with different dimensions.

Although FIGS. 3A-3D illustrate specific geometries of textile cell, any of a wide variety of textile cell geometry can be utilized. In many embodiments, the textile cells have rectangular sides. In some embodiments, the number of lacing elements and maximum possible textile cells chained to one textile cell can differ. The number of lacing elements can affect the shape of the planar side. In a number of embodiments, textile cells of different shapes can be utilized together. If the combination of shapes can be tessellated and the lacing elements are designed for such a pattern, then a laced mesh fabric can be formed with sufficient adaptability.

Integrating Functions into Printed Textiles

Figure 4A:
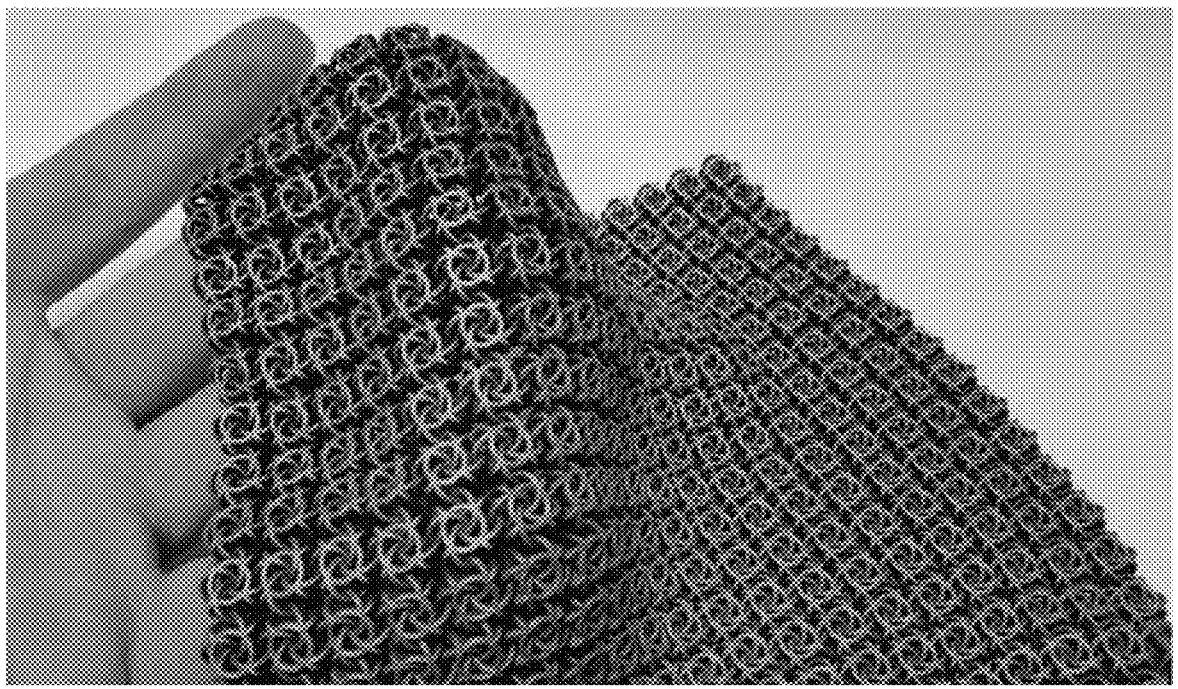
FIGS. 4A and 4B show the adaptability of a fabricated laced mesh fabric in accordance with an embodiment of the invention.
Figure 4B:
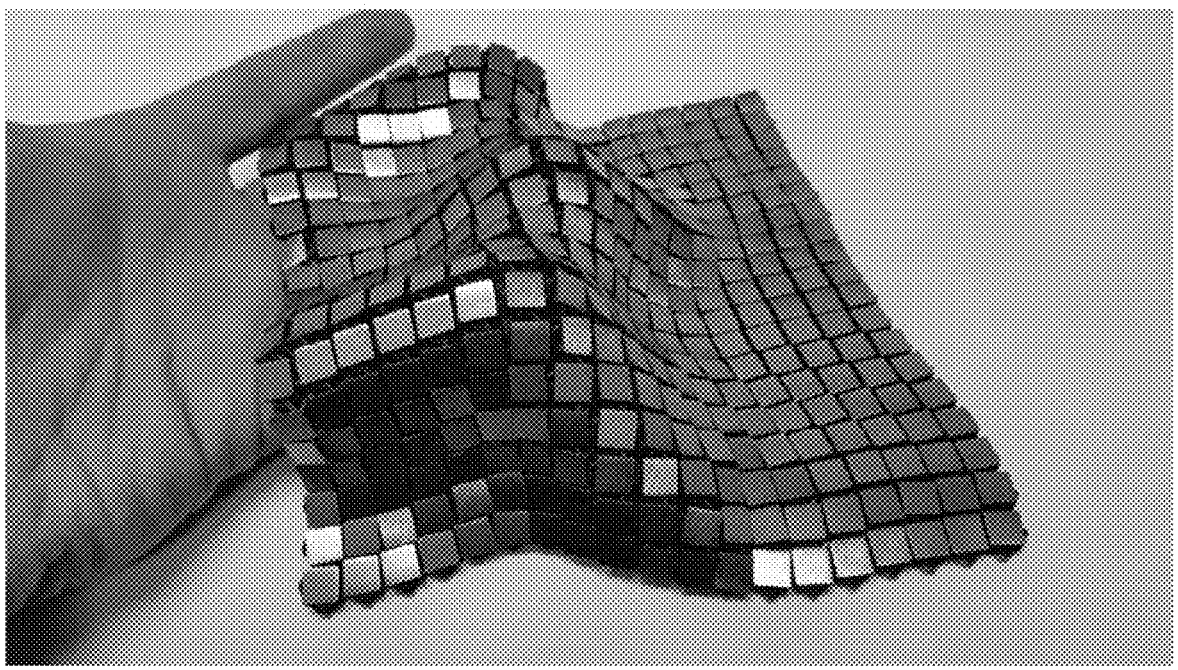

Textile cells in accordance with various embodiments can be designed to integrate various functions. Many different functions can be integrated into the textile cells such that the textile cells can perform the different functions without the need of complex electro-mechanical devices and/or other active systems. In many embodiments, the textile cells are printed using additive manufacturing methods. As such, many design features integrating functions can be incorporated seamlessly together in a textile cell. In various embodiments, the textile cells are designed to have lacing elements that allow the textile cells to chain with one another to form a laced mesh fabric. Such a structure can allow for high foldability and adaptability to different geometrical configurations. For in-space applications, this can greatly reduce transportation costs as the textile fabric can be designed with high compactability, allowing the fabric to fold multiple times and minimizing the general volume by minimizing the void spaces in between the textile components. By minimizing the volume of the stowed configuration of the fabric, transportation costs can be lowered. The laced structure can also allow for high curvability. The ability of the textile fabric to curve locally allows it to conform to specific volumetric conditions and/or generally to any boundary conditions. For example, textile fabrics in accordance with various embodiments of the invention can be formed for use with parabolic surfaces, conic surfaces, and generally any other geometric surfaces. FIGS. 4A and 4B are photographs of a fabricated laced mesh fabric in accordance with an embodiment of the invention. As shown, the fabric is capable of highly conforming to complex surfaces on either side.

In general, a laced structure typically sacrifices mechanical tensile strength for high adaptability and a high strength-to-weight ratio. Many embodiments in accordance with the invention include a textile fabric with a laced structure composed of unibody textile cells that are chained together. By selecting the appropriate material and textile cell geometry and dimensions, satisfactory mechanical integrity can be achieved for specific applications while allowing multi-directional shape adaptability. In many applications, tensile loads are often applied to the laced mesh fabric and the lacing elements of the textile cells. As such, the lacing elements and overall geometries of the textile cells can be designed for such anticipated applications. In various applications, the interface between the fabric and other systems as well as objects that can contact or impact the fabric can create perforation loads, which can result in a "tear" of the laced fabric structure. As such, the textile cells can be designed to mitigate the effect and the extent of the tear. In space applications, impact resistance is a desirable quality as objects such as micrometeorites, tools, and other systems might impact the fabric. In a number of embodiments, the textile cell is designed with a certain amount of elasticity, which can be achieved through the design of the geometry of the textile cell and/or through the choice of material. Design elements addressing other structural concerns of the fabric can include material selection and/or design geometry to account for abrasions and material fatigue. For example, in many applications, the fabric is exposed to frequent shocks, vibrations, and other disturbances that can cause structural fatigue on the fabric. These problems can be addressed by designing the geometries and/or choosing appropriate fabrication materials to create textile cells that are more forgiving to such disturbances.

The textile fabric architecture can be designed to provide thermal management functions to increase durability as well as performance. In many embodiments, the laced mesh fabric is designed for applications with high variations in temperature. In such applications, thermal expansion can be an issue. This can be particularly true for modular systems. Laced mesh fabrics and their component textile cells can be designed such that thermal expansion of the modular textile cells does not prevent the material from functioning in the intended application. In some embodiments, the textile material is designed for in-space applications. As such, thermal shock caused by quick temperature changes due to light and shadow can be an issue. The textile materials can be formed with materials capable of handling this thermal shock. In further embodiments, the material is designed to handle multiple thermal cycles in addition to handling thermal shock.

In addition to handling high temperature fluctuations, laced mesh fabrics in accordance with various embodiments of the invention can be designed to effectively transfer and/or radiate heat. In many embodiments, textile cells making up the fabric can include a planar or curved side. In space applications, the textile material can be implemented with the planar/curved side facing the sun. The planar/curved side can be designed to minimize the active surface area to minimize the absorption of heat. In several embodiments, the textile cell includes a thermal radiating side opposite the planar or curved side designed to have a high surface area to increase its radiation surface such as to increase the release of heat absorbed from the planar or curved side. In other words, the textile cell can be designed to minimize the absorption of energy on one side (side facing the sun) while the other side is designed for thermal dissipation (side facing dark side). In a number of embodiments, the planar or curved side can be designed to have high reflectivity. High reflectivity can be achieved through geometry, choice of textile material, and/or coating the side with another material having high reflectivity. In further embodiments, the textile is designed to reflect a specific portion of the electromagnetic spectrum, such as the visible spectral band.

A laced structure can also allow for the fabrication of large continuous surfaces of the textile material. The geometry of the textile cells can be designed to enable easy connection points to extend or connect assemblies for extension or repair purposes. In many embodiments, the links are designed to allow for disengagement without affecting the structural integrity of the remaining textile. In some embodiments, the textile cells are designed to allow for the joining of future textile cells. In further embodiments, the lacing elements of the textile cells are not fully closed to enable chaining and unchaining. The disconnect can be strategically placed such that the textile cells are locked together while under tensile load. In other embodiments, the lacing elements are fully closed and the joining of multiple surfaces can be done through welding.

Although only a few functions are discussed, it is evident that printed textile fabrics in accordance with various embodiments of the invention can be designed to incorporate within the geometry of the fabric any of a number of other functions, such as but not limited to embedded thermal channels, electronic circuits, and other structural functions.

Fabrication Methods

Figure 5:
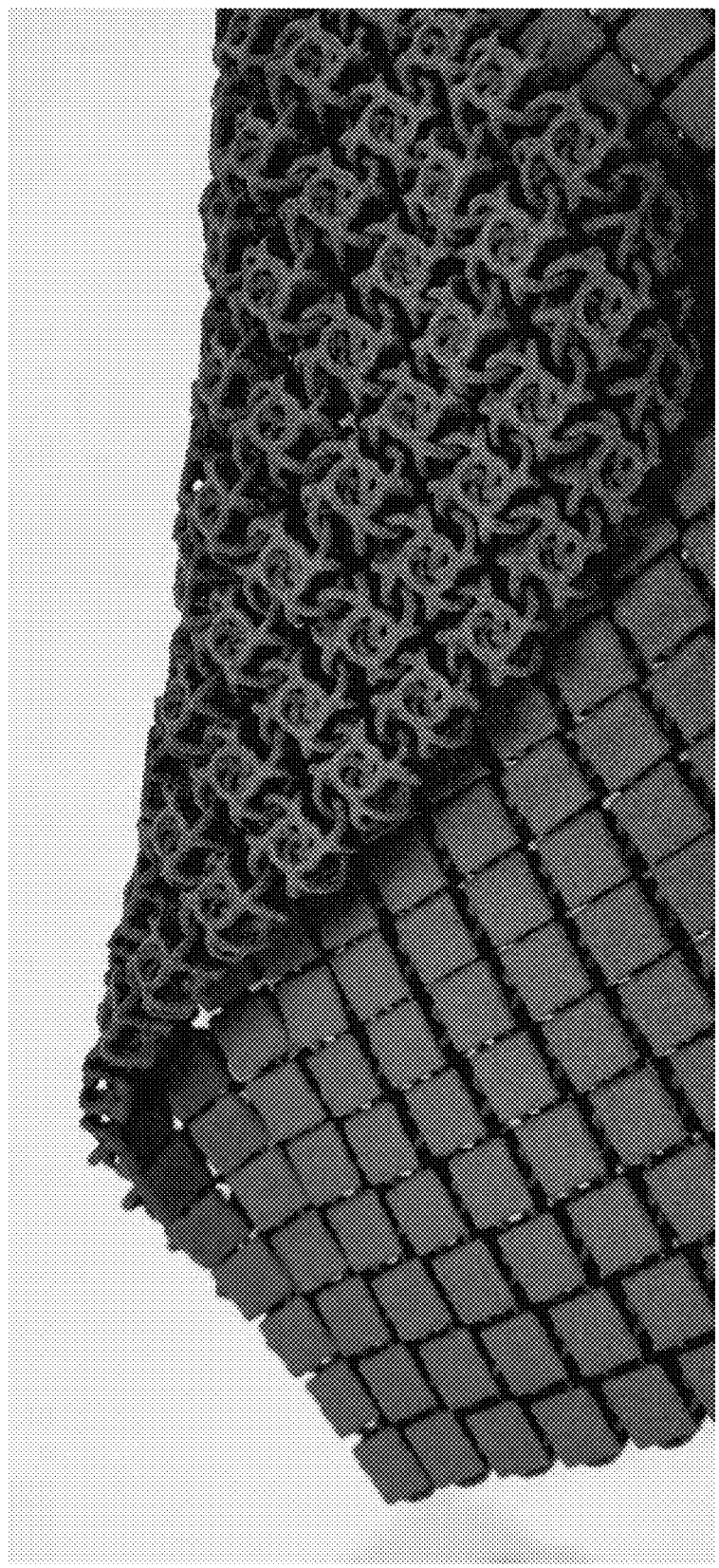
FIG. 5 shows a fabricated laced mesh fabric printed using metal in accordance with an embodiment of the invention.
Figure 6:
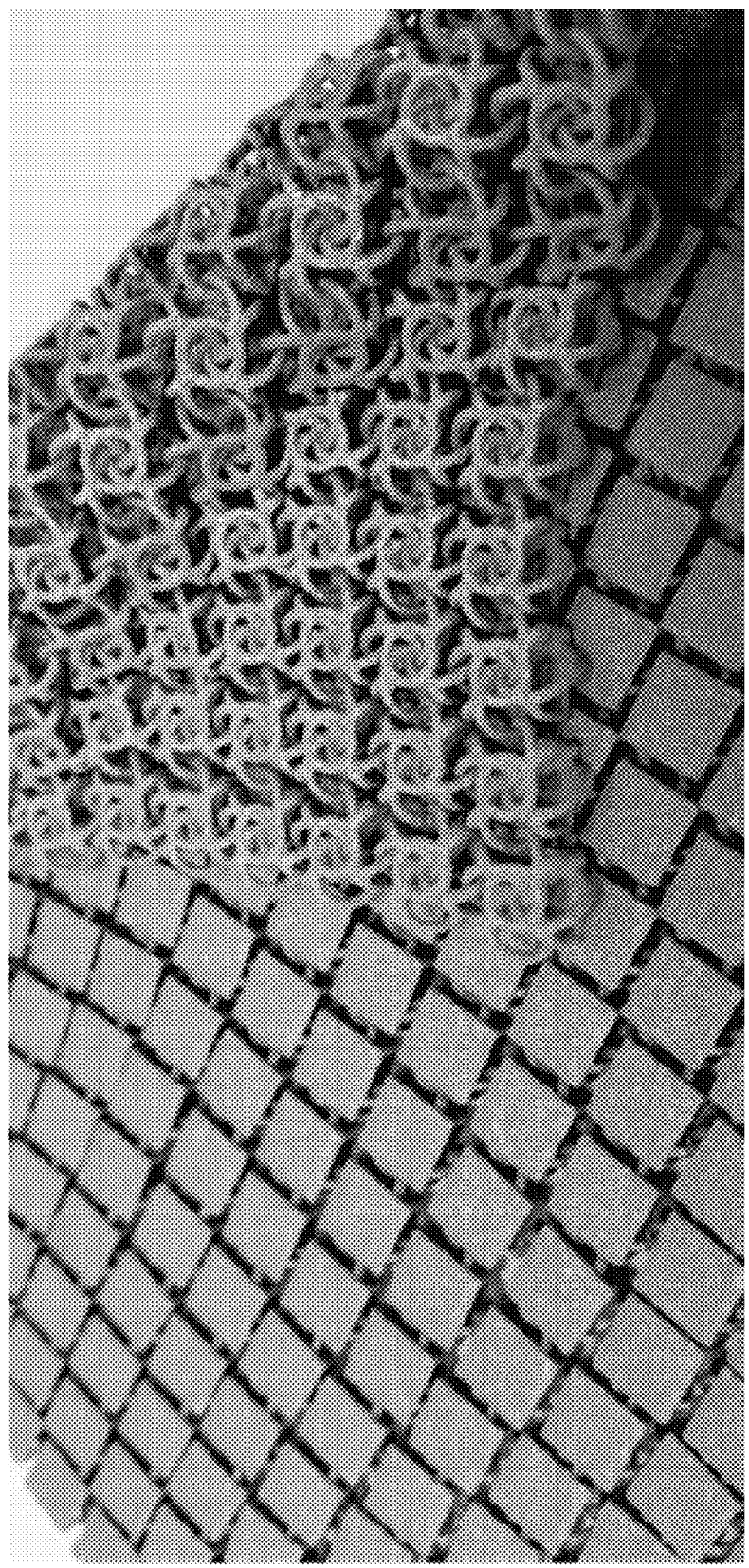
FIG. 6 shows a fabricated laced mesh fabric printed using carbon fiber reinforced nylon in accordance with an embodiment of the invention.
Figure 7:
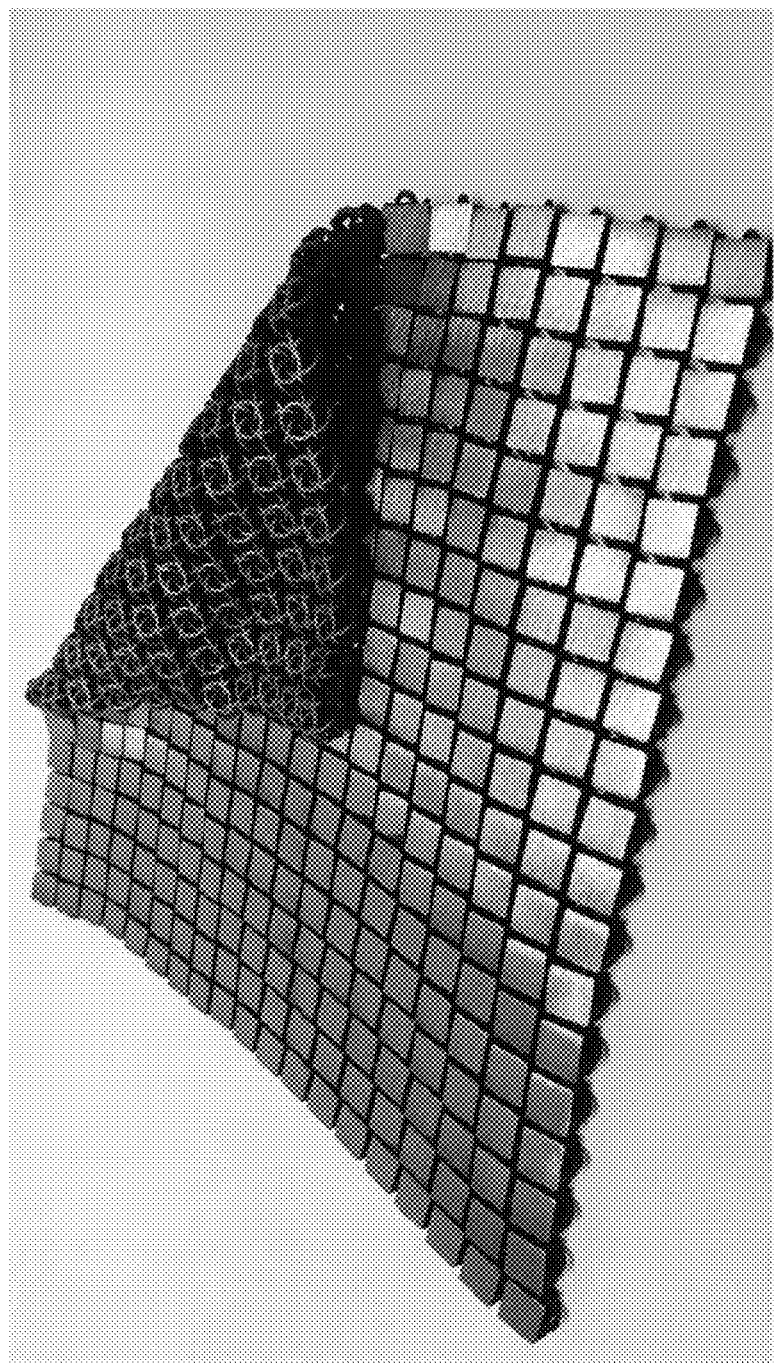
FIG. 7 shows a fabricated laced mesh fabric printed using aluminum infused nylon in accordance with an embodiment of the invention.

Textile materials in accordance with various embodiments can be manufactured in many different ways. In a number of embodiments, the textile materials are fabricated using additive manufacturing techniques. As discussed above, laced mesh fabrics can include textile cells with lacing elements capable of linking with other lacing elements of other textile cells to form a laced fabric structure. Using additive manufacturing techniques, the laced mesh fabric can be fabricated such that textile cells are fabricated in their chained configuration in a single build. In a number of embodiments, the manufacturing process has limited post-processing. The textile cell can be printed in a variety of different materials, including but not limited to metals, polymers, ceramics, alloys, and multi-material composites. Multi-materials can include but are not limited to aluminum infused nylon, carbon fiber reinforced nylon, and carbon fiber reinforced nylon coated with chrome. FIGS. 5-7 show various textile fabrics printed using metal, carbon fiber reinforced nylon, and aluminum infused nylon in accordance with various embodiments of the invention.

Depending on the type of material, different additive manufacturing processes can be used for fabrication. For example, in embodiments where the textile cell is to be fabricated with metal (such as but not limited to stainless steel 15-5), direct metal laser sintering ("DMLS") and other powder bed processes can be used. In a number of embodiments, the textile fabric is printed with a metal gradient. Other forms of additive manufacturing that can be used include but are not limited to directed energy deposition, vat printing, and stereolithography. The specific type of additive manufacturing process utilized can ultimately depend on the type of material to be printed and/or the given application.

In some applications, the textile fabric is intended to be manufactured in space, and the additive manufacturing process can be chosen accordingly. The in-space manufacturability of a given textile fabric design can take into considerations many factors. For example, in-space manufacturing processes should be compatible in a low gravity environment without the complexity of traditional looms. In-space manufacturing can also prefer low energy processes. In this regards, additive manufacturing processes for polymers such as fused deposition modeling and stereolithography can be less energy demanding than pure metal additive manufacturing processes such as DMLS.

In addition to manufacturing processes, the choice of material can depend on the specific requirements of a given application. For example, in space applications, the material can be a low-outgassing so that the fabric does not interfere or contaminate with other on-board systems. Another material property to consider for space applications can include the radiation tolerance of the material due to the environmental conditions in which the material will be operating. In low earth orbit operations, the material can be chosen for its resistance to free $O_3$. As can readily be appreciated, there are many material properties that can affect the choice of suitable material for a given application.

In many embodiments, the textile fabric can be printed in a polymer and metal coated to increase its tensile strength, reflectivity, and/or other properties. For some applications, metal-coated polymer structures can have the adequate functions while maintaining a high strength-to-weight ratio. Metal coating can be performed using any of a variety of processes such as but not limited to electro-plating. In addition to metal coating, other types of multi-material fabrication processes can be used. In some embodiments, polymers infused with metal particles can be used for fabrication of the textile fabric.

Although specific printed textile fabrics are discussed above, a person having ordinary skill in the art would appreciate that any of a number of different configurations and designs of printed textile fabrics can be utilized in accordance with various embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A printed textile fabric comprising;
   a plurality of textile cells, each textile cell having a cell body comprising:
      a thermal absorbing side; and
      a thermal radiating side comprising a plurality of lacing elements;
   wherein:
      the surface area of the thermal radiating side is higher than the thermal absorbing side;
      the thermal absorbing side absorbs electromagnetic energy and the thermal radiating side radiates electromagnetic energy;
      each of the plurality of textile cells links with another one of the plurality of textile cells through the plurality of lacing elements;
      wherein the plurality of lacing elements comprises a plurality of lacing rings;
      wherein the thermal absorbing side defines a plane that intersects at least two points on the thermal absorbing side, and the plurality of lacing rings are configured to extend out of the plane on the side of the cell body opposite the thermal absorbing side at an acute angle relative to the plane; and
      the printed textile fabric further comprising at least one support ring disposed above the plane and parallel thereto, the at least one support ring being interconnected with each of the plurality of lacing rings.

2. The printed textile fabric of claim 1, further comprising a plurality of support pillars extending out of the plane, each support pillar being interconnected with at least two of the plurality of lacing rings.

3. The printed textile fabric of claim 2, wherein the plurality of support pillars are disposed at the corners of their respective textile cell.

4. The printed textile fabric of claim 1, further comprising a plurality of support pillars extending out of the plane, each support pillar being interconnected with at least two of the plurality of lacing rings and the support ring.

5. The printed textile fabric of claim 4, wherein the plurality of support pillars are disposed at the corners of their respective textile cell.

6. The printed textile fabric of claim 1, wherein the thermal absorbing side is about 7 mm wide by about 7 mm long and each of the lacing rings has a ring thickness between about 0.8 mm to about 1.5 mm.

7. The printed textile fabric of claim 1, wherein the lacing rings have non-identical thicknesses with each other.

8. The printed textile fabric of claim 1, wherein each of the lacing elements is fully enclosed.

9. The printed textile fabric of claim 1, wherein the plurality of textile cells is made of a polymer.

10. The printed textile fabric of claim 9, wherein the plurality of textile cells is coated with a metal.

11. The printed textile fabric of claim 10, wherein the plurality of textile cells is made of carbon fiber reinforced nylon.

12. The printed textile fabric of claim 1, wherein the plurality of textile cells is made of a low-outgassing and $O_3$ resistant material.

13. The printed textile fabric of claim 1, wherein the thermal absorbing side comprises a reflective material layer.

14. The printed textile fabric of claim 1, wherein multiple cell bodies are interconnected together through interlinked lace rings.

15. The printed textile fabric of claim 14, wherein each adjacent cell body is interconnected via a pair of interlinked lacing rings, one lace ring of the pair being disposed on each of the cell bodies.

16. The printed textile fabric of claim 1, wherein the plurality of lacing rings are encased within the cell body.

17. The printed textile fabric of claim 1, wherein the lacing rings are disposed at angles relative to the plane that are non-identical.

18. A printed textile fabric comprising;
a plurality of textile cells, each textile cell having a cell body comprising:
  a thermal absorbing side; and
  a thermal radiating side comprising a plurality of lacing elements;
wherein:
  the surface area of the thermal radiating side is higher than the thermal absorbing side;
  the thermal absorbing side absorbs electromagnetic energy and the thermal radiating side radiates electromagnetic energy;
  each of the plurality of textile cells links with another one of the plurality of textile cells through the plurality of lacing elements; and
wherein each of the lacing elements is fully enclosed.

19. The printed textile fabric of claim 18, wherein the plurality of lacing elements comprises a plurality of lacing rings.

20. The printed textile fabric of claim 19, wherein:
the thermal absorbing side defines a plane that intersects at least two points on the thermal absorbing side; and
the plurality of lacing rings are configured to extend out of the plane on the side of the cell body opposite the thermal absorbing side at an acute angle relative to the plane.

21. The printed textile fabric of claim 20, further comprising at least one support ring disposed above the plane and parallel thereto, the at least one support ring being interconnected with each of the plurality of lacing rings.

22. The printed textile fabric of claim 18, further comprising a plurality of support pillars extending out of the plane, each support pillar being interconnected with at least two of the plurality of lacing rings.

23. The printed textile fabric of claim 22, wherein the plurality of support pillars are disposed at the corners of their respective textile cell.

24. The printed textile fabric of claim 21, further comprising a plurality of support pillars extending out of the plane, each support pillar being interconnected with at least two of the plurality of lacing rings and the support ring.

25. The printed textile fabric of claim 24, wherein the plurality of support pillars are disposed at the corners of their respective textile cell.

* * * * *